US012588117B2

(12) United States Patent
Zhang et al.

(10) Patent No.: US 12,588,117 B2
(45) **Date of Patent: *Mar. 24, 2026**

(54) PORTABLE LIGHTING DEVICE

(71) Applicant: MILWAUKEE ELECTRIC TOOL CORPORATION, Brookfield, WI (US)

(72) Inventors: Li Zhang, Dongguan City (CN); Hao Cui, Dongguan City (CN); DanJun Guo, Dongguan City (CN)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 73 days.

This patent is subject to a terminal disclaimer.

(21) Appl. No.: 18/535,385

(22) Filed: Dec. 11, 2023

(65) Prior Publication Data

US 2024/0107641 A1 Mar. 28, 2024

Related U.S. Application Data

(63) Continuation of application No. 18/151,086, filed on Jan. 6, 2023, now Pat. No. 11,871,487, which is a (Continued)

(30) Foreign Application Priority Data

Nov. 30, 2018 (CN) ......................... 201822007596.4

(51) Int. Cl.

*H05B 45/10* (2020.01)
*F21L 4/00* (2006.01)

(Continued)

(52) U.S. Cl.

CPC .............. *H05B 45/10* (2020.01); *F21L 4/005* (2013.01); *F21V 15/01* (2013.01); *F21V 23/003* (2013.01);

(Continued)

(58) Field of Classification Search

CPC ........ H05B 45/10; H05B 47/10; H05B 47/16; H05B 47/17; H05B 47/105; F21L 4/005;

(Continued)

(56) References Cited

U.S. PATENT DOCUMENTS

| | | | |
|---|---|---|---|
| D404,838 | S | 1/1999 | Magnusson |
| 5,871,272 | A | 2/1999 | Sharrah et al. |

(Continued)

FOREIGN PATENT DOCUMENTS

| | | |
|---|---|---|
| CN | 1230040 | 9/1999 |
| CN | 1467994 | 1/2004 |

(Continued)

OTHER PUBLICATIONS

Chinese Patent Office Action for Application No. 201911037586.8 dated Dec. 5, 2022 (12 pages including statement of relevance).

*Primary Examiner* — Minh Tran

(74) *Attorney, Agent, or Firm* — Michael Best & Friedrich LLP

(57) ABSTRACT

A portable lighting device includes a housing, a light source supported by the housing, and an alkaline battery positioned within the housing and coupled to the light source. The alkaline battery is configured to provide a drive current to the light source, and an intensity of the light source is dependent on the drive current. The portable lighting device also includes an electronic processor positioned within the housing and coupled to the light source and the alkaline battery. The electronic processor is configured to monitor a voltage of the alkaline battery, and execute a ramp-up algorithm to control the drive current based on the voltage of the alkaline battery.

20 Claims, 17 Drawing Sheets

Related U.S. Application Data continuation of application No. 16/689,359, filed on Nov. 20, 2019, now Pat. No. 11,589,434.

(51) Int. Cl.

| | |
|---|---|
| ***F21V 15/01*** | (2006.01) |
| ***F21V 23/00*** | (2015.01) |
| ***F21V 23/02*** | (2006.01) |
| ***F21V 23/04*** | (2006.01) |
| ***H05B 47/10*** | (2020.01) |
| ***H05B 47/16*** | (2020.01) |
| ***H05B 47/17*** | (2020.01) |
| *F21Y 115/10* | (2016.01) |

(52) U.S. Cl.
CPC .......... *F21V 23/02* (2013.01); *F21V 23/0414* (2013.01); *H05B 47/10* (2020.01); *H05B 47/16* (2020.01); *H05B 47/17* (2020.01); *F21Y 2115/10* (2016.08)

(58) Field of Classification Search
CPC ........ F21V 15/01; F21V 23/003; F21V 23/02; F21V 23/0414; F21Y 2115/10; Y02B 20/40
See application file for complete search history.

(56) References Cited

U.S. PATENT DOCUMENTS 6,095,661 A 8/2000 Lebens et al.
6,179,431 B1 1/2001 Chien
6,231,370 B1 5/2001 Morin et al.
6,305,818 B1 10/2001 Lebens et al.
6,488,390 B1 12/2002 Lebens et al.
6,573,659 B2 6/2003 Toma et al.
6,808,287 B2 10/2004 Lebens et al.
D515,228 S 2/2006 Gebhard et al.
7,186,000 B2 3/2007 Lebens et al.
7,186,002 B2 3/2007 Matthews et al.
7,196,477 B2 3/2007 Richmond
D541,962 S 5/2007 Bayat et al.
D544,620 S 6/2007 Son
D550,387 S 9/2007 Guercio
D554,781 S 11/2007 Shiu
7,338,189 B2 3/2008 Kovacik et al.
7,344,270 B2 3/2008 Kim
D573,285 S 7/2008 Zettl
D573,286 S 7/2008 Zettl
7,393,119 B2 7/2008 Lebens et al.
7,429,827 B2 9/2008 Richmond
7,517,107 B2 4/2009 Dallas et al.
7,740,371 B1 6/2010 Lebens et al.
7,850,330 B2 12/2010 Spartano et al.
7,888,883 B2 2/2011 Crawford et al.
7,942,553 B2 5/2011 Huang
7,959,317 B2 6/2011 Spartano et al.
D646,822 S 10/2011 Johannessen et al.
8,063,607 B2 11/2011 Crawford et al.
8,104,915 B1 1/2012 Osterhout et al.
8,115,492 B2 2/2012 Crawford et al.
8,120,268 B2 2/2012 Spartano et al.
8,134,300 B2 3/2012 Maglica et al.
8,159,146 B1 4/2012 Lebens et al.
8,197,085 B2 6/2012 Spartano
D666,346 S 8/2012 Gebhard et al.
8,324,836 B2 12/2012 Crawford et al.
8,362,700 B2 1/2013 Richmond
8,362,712 B1 1/2013 Lebens et al.
8,414,142 B2 4/2013 Tucker et al.
8,628,210 B2 1/2014 Tucker et al.
8,643,305 B2 2/2014 Lebens et al.
D703,851 S 4/2014 Gebhard et al.
8,717,034 B2 5/2014 Crawford et al.
8,727,561 B2 5/2014 Sharrah et al.
D708,376 S 7/2014 Crowe et al.
8,779,683 B2 7/2014 Snyder et al.
8,810,191 B2 8/2014 Maldonado
D713,076 S 9/2014 von Waldthausen
8,829,808 B1 9/2014 Lebens et al.
8,853,951 B2 10/2014 Garcia
8,866,392 B2 10/2014 Chen
D721,841 S 1/2015 Kwon et al.
8,975,822 B2 3/2015 Maglica et al.
D731,687 S 6/2015 Haws
D734,887 S 7/2015 Gebhard et al.
9,101,022 B2 8/2015 Hoffman et al.
9,119,266 B1 8/2015 Lebens et al.
D739,063 S 9/2015 Su
D742,568 S 11/2015 Abernethy
9,179,520 B2 11/2015 Trattler
D745,990 S 12/2015 Gebhard et al.
9,252,613 B2 2/2016 Kugel et al.
D757,318 S 5/2016 Evans
D764,087 S 8/2016 Workman et al.
D766,477 S 9/2016 Ma
9,447,951 B2 9/2016 Maglica et al.
9,549,454 B2 1/2017 Maglica et al.
9,801,256 B2 10/2017 Maglica et al.
D805,666 S 12/2017 Nguyen et al.
D806,923 S 1/2018 Koshiba
D810,335 S 2/2018 Levy et al.
D819,245 S 5/2018 Gerza
D821,007 S 6/2018 Chen
10,001,252 B2 6/2018 Inskeep
D831,248 S 10/2018 Kuhls
10,091,854 B1 10/2018 Brandon, II
D852,399 S 6/2019 Chen et al.
D852,400 S 6/2019 Wang
D854,207 S 7/2019 Zheng
D855,228 S 7/2019 Cooper et al.
D857,958 S 8/2019 Willows et al.
D858,830 S 9/2019 Grandadam
D858,831 S 9/2019 Proeber
D858,833 S 9/2019 Cooper
D858,837 S 9/2019 Vazquez et al.
D859,718 S 9/2019 Groat
D861,209 S 9/2019 Cooper
D863,613 S 10/2019 Korpi
D863,615 S 10/2019 Renvall
D863,616 S 10/2019 Renvall
D866,818 S 11/2019 Lindholm
D867,629 S 11/2019 Renvall
D884,957 S 5/2020 Dennis et al.
D907,272 S 1/2021 Takahashi et al.
11,035,556 B2 6/2021 Proeber et al.
D957,023 S 7/2022 Greenwaldt et al.
11,589,434 B2 * 2/2023 Zhang .................... F21V 15/01
D982,208 S 3/2023 Ouyang
D986,462 S 5/2023 Zhang
11,871,487 B2 * 1/2024 Zhang .................... H05B 47/16
2003/0076051 A1 4/2003 Bowman et al.
2003/0234778 A1 12/2003 Kim
2006/0043911 A1 3/2006 Shao et al.
2006/0072306 A1 4/2006 Woodyard
2006/0109662 A1 5/2006 Reiff et al.
2007/0014103 A1 1/2007 Teng et al.
2008/0112160 A1 5/2008 Robinson et al.
2008/0225518 A1 9/2008 Devaney et al.
2008/0258642 A1 10/2008 Patel
2008/0304254 A1 12/2008 Canino et al.
2009/0085502 A1 4/2009 Geris et al.
2010/0084997 A1 4/2010 Oberzeir et al.
2010/0277899 A1 11/2010 Peak
2012/0033412 A1 2/2012 Molina et al.
2012/0033415 A1 2/2012 Sharrah et al.
2012/0182723 A1 7/2012 Sharrah et al.
2012/0182727 A1 7/2012 Sharrah et al.
2012/0182748 A1 7/2012 McCaslin et al.
2012/0236551 A1 9/2012 Sharrah et al.
2012/0286940 A1 11/2012 Carmen, Jr. et al.
2013/0049610 A1 * 2/2013 Chen ..................... H05B 45/48
315/159
2013/0170189 A1 7/2013 Staeubli et al.

(56) References Cited

U.S. PATENT DOCUMENTS

| | | | |
|---|---|---|---|
| 2013/0258649 | A1 | 10/2013 | Mueckl et al. |
| 2013/0328402 | A1 | 12/2013 | Noguchi |
| 2014/0085876 | A1 | 3/2014 | Fields et al. |
| 2014/0126192 | A1 | 5/2014 | Ancona et al. |
| 2014/0126226 | A1 | 5/2014 | Wang |
| 2015/0131276 | A1 | 5/2015 | Thompson et al. |
| 2015/0247628 | A1 | 9/2015 | Li |
| 2015/0267902 | A1 | 9/2015 | Zhang |
| 2016/0061429 | A1 | 3/2016 | Waalkes et al. |
| 2016/0128151 | A1 | 5/2016 | Luick et al. |
| 2016/0265754 | A1 | 9/2016 | Sun |
| 2016/0356439 | A1 | 12/2016 | Inskeep |
| 2017/0284646 | A1 | 10/2017 | Arena et al. |
| 2017/0292659 | A1 | 10/2017 | Bayat et al. |
| 2018/0027627 | A1 | 1/2018 | Maglica et al. |
| 2018/0034313 | A1 | 2/2018 | Frankland et al. |
| 2018/0156427 | A1 | 6/2018 | Bailey et al. |
| 2018/0224077 | A1 | 8/2018 | Bian |
| 2018/0266637 | A1 | 9/2018 | Curlett et al. |
| 2019/0331326 | A1 | 10/2019 | Proeber et al. |
| 2020/0300446 | A1 | 9/2020 | Sergyeyenko et al. |
| 2020/0340634 | A1 | 10/2020 | Puzio et al. |

FOREIGN PATENT DOCUMENTS

| | | |
|---|---|---|
| CN | 101146388 | 3/2008 |
| CN | 101485076 | 7/2009 |
| CN | 201360368 | 12/2009 |
| CN | 202551454 | 11/2012 |
| CN | 102970787 | 3/2013 |
| CN | 203942676 | 11/2014 |
| CN | 104235741 | 12/2014 |
| CN | 107864531 | 3/2018 |
| EP | 2827684 | 1/2015 |
| JP | 2013033644 | 2/2013 |
| KR | 2020160002590 | 7/2016 |
| WO | 2010027460 | 3/2010 |
| WO | 2012158383 | 11/2012 |
| WO | 2016134396 | 9/2016 |
| WO | 2017031586 | 3/2017 |

* cited by examiner

PORTABLE LIGHTING DEVICE

RELATED APPLICATIONS

The present application is a continuation of U.S. patent application Ser. No. 18/151,086, filed Jan. 6, 2023, now U.S. Pat. No. 11.871,487, which is a continuation of U.S. patent application Ser. No. 16/689,359, filed Nov. 20, 2019, now U.S. Pat. No. 11,589,434, which claims priority benefit to Chinese Utility Model Application No. 201822007596.4, filed Nov. 30, 2018, now abandoned, the entire contents of each of which are hereby incorporated by reference.

TECHNICAL FIELD

The present disclosure relates to lighting devices. More specifically, the present disclosure relates to portable lighting devices having adjustable light outputs.

BACKGROUND

Portable lighting devices such as torches are commonly used for illumination. These devices typically include a light source selectively powered by a power source.

SUMMARY OF THE DISCLOSURE

In one embodiment, a portable lighting device comprises a housing defining a central longitudinal axis, a clip coupled to the housing, a light source supported by the housing, and a power source positioned within the housing and coupled to the light source. The housing includes a plurality of longitudinally-extending surfaces arranged at different angles around the central longitudinal axis to direct light from the light source in various directions when resting on a support surface. The clip is rotatable relative to the housing about the central longitudinal axis to serve as a stand when resting on the support surface.

In another embodiment, a portable lighting device comprises a housing, a light source supported by the housing, a power source positioned within the housing and coupled to the light source, and a controller positioned within the housing and coupled to the light source and the power source. The controller is operable to execute a ramp-up algorithm and/or a ramp-down algorithm to control an intensity of light outputted by the light source based on a remaining charge in the power source.

In one embodiment, a portable lighting device includes a housing, a light source supported by the housing, and a power source positioned within the housing and coupled to the light source. The power source is configured to provide a drive current to the light source, and an intensity of the light source is dependent on the drive current. The portable lighting device may further include an actuator positioned on the housing and an electronic processor positioned within the housing and coupled to the light source, the power source, and the actuator. The electronic processor is configured to determine that the actuator has been actuated, determine a first operation mode of the light source in response to determining that the actuator has been actuated, measure a voltage of the power source, determine whether to operate the light source in the first operation mode by comparing the voltage of the power source to a predetermined threshold associated with the first operation mode, and control the drive current to operate the light source in a second operation mode in response to determining that the voltage of the power source is less than the predetermined threshold, wherein the drive current of the second operation mode is less than the drive current of the first operation mode. The first operation mode may be a high mode and the second operation mode may be a low mode. The first operation mode may be a low mode and the second operation mode may be an off mode. The electronic processor may be configured to control the drive current by controlling a pulse width modulation (PWM) duty cycle that controls when the power source provides the drive current to the light source. The light source may include at least one light emitting diode.

In another embodiment, a portable lighting device includes a housing, a light source supported by the housing, and a power source positioned within the housing and coupled to the light source. The power source is configured to provide a drive current to the light source, and an intensity of the light source is dependent on the drive current. The portable lighting device may further include an electronic processor positioned within the housing and coupled to the light source and the power source. The electronic processor may be configured to measure a voltage of the power source, determine that the voltage of the power source is less than a first predetermined threshold, control the drive current to operate the light source in a low current operation mode, determine whether the voltage of the power source is greater than a second predetermined threshold, wherein the second predetermined threshold is lower than the first predetermined threshold, increase the drive current in response to determining that the voltage of the power source is greater than the second predetermined threshold, determine whether the drive current has increased to be greater than or equal to the drive current of a high current operation mode of the light source, and in response to determining that the drive current has increased to be greater than or equal to the drive current of the high current operation mode of the light source, control the drive current to operate the light source in the high current operation mode. The electronic processor may be further configured to in response to determining that the drive current has not increased to be greater than or equal to the drive current of the high current operation mode of the light source, repeat the steps of delaying a predetermined period of time, determining whether the voltage of the power source is greater than the second predetermined threshold, further increasing the drive current in response to determining that the voltage of the power source is greater than the second predetermined threshold, and determining whether the drive current has increased to be greater than or equal to the drive current of the high current operation mode of the light source. The electronic processor may be configured to, in response to determining that the voltage of the power source is less than the second predetermined threshold, control the drive current to operate the light source in the low current operation mode without increasing the drive current. The portable lighting device may include an actuator positioned on the housing and coupled to the electronic processor, wherein the electronic processor may be configured to determine a selected operation mode of the light source in response to determining that the actuator has been actuated. The electronic processor may be configured to control the drive current by controlling a pulse width modulation (PWM) duty cycle that controls when the power source provides the drive current to the light source. The power source may include at least one alkaline battery.

In another embodiment, a portable lighting device includes a housing, a light source supported by the housing, and a power source positioned within the housing and coupled to the light source. The power source may be configured to provide a drive current to the light source, and an intensity of the light source is dependent on the drive current. The portable lighting device may include an electronic processor positioned within the housing and coupled to the light source and the power source. The electronic processor may be configured to measure a voltage of the power source, determine a drive current threshold based on the voltage of the power source, control the drive current to be a first value, determine whether the drive current is greater than the drive current threshold, and in response to determining that the drive current is less than the drive current threshold, repeating the steps of increasing the drive current, delaying a predetermined time period, and determining whether the increased value of the drive current is greater than the drive current threshold. The electronic processor may be further configured to, in response to determining that the increased value of the drive current is greater than the drive current threshold, cease increasing of the drive current and control the drive current to be the increased value to operate the light source. The first value of the drive current may correspond to one of a low current operation mode of the light source and an off mode of the light source. The electronic processor may be configured to control the drive current by controlling a pulse width modulation (PWM) duty cycle that controls when the power source provides the drive current to the light source.

In another embodiment, a portable lighting device includes a housing, a light source supported by the housing, and a power source positioned within the housing and coupled to the light source, wherein the power source is configured to provide a drive current to the light source, and an intensity of the light source is dependent on the drive current. The portable lighting device may further include an electronic processor positioned within the housing and coupled to the light source and the power source. The electronic processor may be configured to control the drive current to operate the light source in a selected operation mode, monitor a voltage of the power source, determine whether the voltage of the power source is less than a power-off threshold, in response to determining that the voltage of the power source is greater than the power-off threshold, repeating the steps of decreasing the drive current, delaying a predetermined time period, and determining whether the voltage of the power source is less than the power-off threshold. The electronic processor may be further configured to, in response to determining that the voltage of the power source is less than the power-off threshold, control the drive current to cease providing the drive current to the light source to turn off the light source. The electronic processor may be further configured to decrease the drive current by reducing a pulse width modulation (PWM) duty cycle that controls when the power source provides the drive current to the light source. Repeating the steps of decreasing the drive current, delaying the predetermined time period, and determining whether the voltage of the power source is less than the power-off threshold may include ramping down the drive current over a plurality of time stages, wherein the electronic processor is configured to decrease the drive current such that the drive current reaches a respective predetermined value at an end of each time stage. During a final stage of the plurality of time stages, the electronic processor may be configured to control the drive current to be maintained at a constant value until the voltage of the power source is less than the power-off threshold. During a final stage of the plurality of time stages, the electronic processor may be configured to monitor the drive current provided by the power source to the light source, control a drive current pulse width modulation (PWM) duty cycle to be maintained at a constant value until the monitored drive current is less than a low drive current threshold, and, in response to determining that the monitored drive current is less than a low drive current threshold, control the drive current to cease providing the drive current to the light source to turn off the light source. The portable lighting device may further include an actuator positioned on the housing and coupled to the electronic processor. The electronic processor may be configured to control the drive current to operate the light source in the selected operation mode by controlling the drive current to operate the light source in a low current operation mode, delaying a predetermined period of time, determining the selected operation mode of the light source based on the actuator being actuated, measuring the voltage of the power source, determining a starting value of the drive current based on the selected operation mode of the light source and the voltage of the power source, and controlling the drive current to be the starting value. The selected operation mode may be a high current operation mode and the electronic processor may be configured to control the drive current to ramp up to the high current operation mode by measuring the voltage of the power source, determining that the voltage of the power source is less than a first predetermined threshold, controlling the drive current to operate the light source in a low current operation mode, determining whether the voltage of the power source is greater than a second predetermined threshold, wherein the second predetermined threshold is lower than the first predetermined threshold, increasing the drive current in response to determining that the voltage of the power source is greater than the second predetermined threshold, determining whether the drive current has increased to be greater than or equal to the drive current of the high current operation mode of the light source, and, in response to determining that the drive current has increased to be greater than or equal to the drive current of the high operation current mode of the light source, control the drive current to operate the light source in the high current operation mode. The electronic processor may be configured to, in response to determining that the drive current has not increased to be greater than or equal to the drive current of the high current operation mode of the light source, repeat the steps of delaying a predetermined period of time, determining whether the voltage of the power source is greater than the second predetermined threshold, further increasing the drive current in response to determining that the voltage of the power source is greater than the second predetermined threshold, and determining whether the drive current has increased to be greater than or equal to the drive current of the high current operation mode of the light source.

In another embodiment, a portable lighting device includes a housing, a light source supported by the housing, and an alkaline battery positioned within the housing and coupled to the light source, wherein the alkaline battery is configured to provide a drive current to the light source, and an intensity of the light source is dependent on the drive current. The portable lighting device may also include an electronic processor positioned within the housing and coupled to the light source and the alkaline battery. The electronic processor may be configured to monitor a voltage of the alkaline battery, and execute a ramp-up algorithm to control the drive current based on the voltage of the alkaline battery.

In another embodiment, a portable lighting device includes a housing, a light source supported by the housing, and an alkaline battery positioned within the housing and coupled to the light source, wherein the alkaline battery is configured to provide a drive current to the light source, and an intensity of the light source is dependent on the drive current. The portable lighting device may also include an electronic processor positioned within the housing and coupled to the light source and the alkaline battery. The electronic processor may be configured to monitor a time that the light source has been operating, and execute a ramp-down algorithm to control the drive current based on the time that the light source has been operating.

Other aspects of the disclosure will become apparent by consideration of the detailed description and accompanying drawings.

DETAILED DESCRIPTION

Before any embodiments of the disclosure are explained in detail, it is to be understood that the application is not limited to the details of construction and the arrangement of components set forth in the following description or illustrated in the following drawings. The application is capable of other embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly to encompass both direct and indirect mountings, connections, supports, and couplings.

As described herein, terms such as "front," "rear," "side," "top," "bottom," "above," "below," "upwardly," "downwardly," "inward," and "outward" are intended to facilitate the description of the lighting device of the application, and are not intended to limit the structure of the application to any particular position or orientation.

Figure 1:
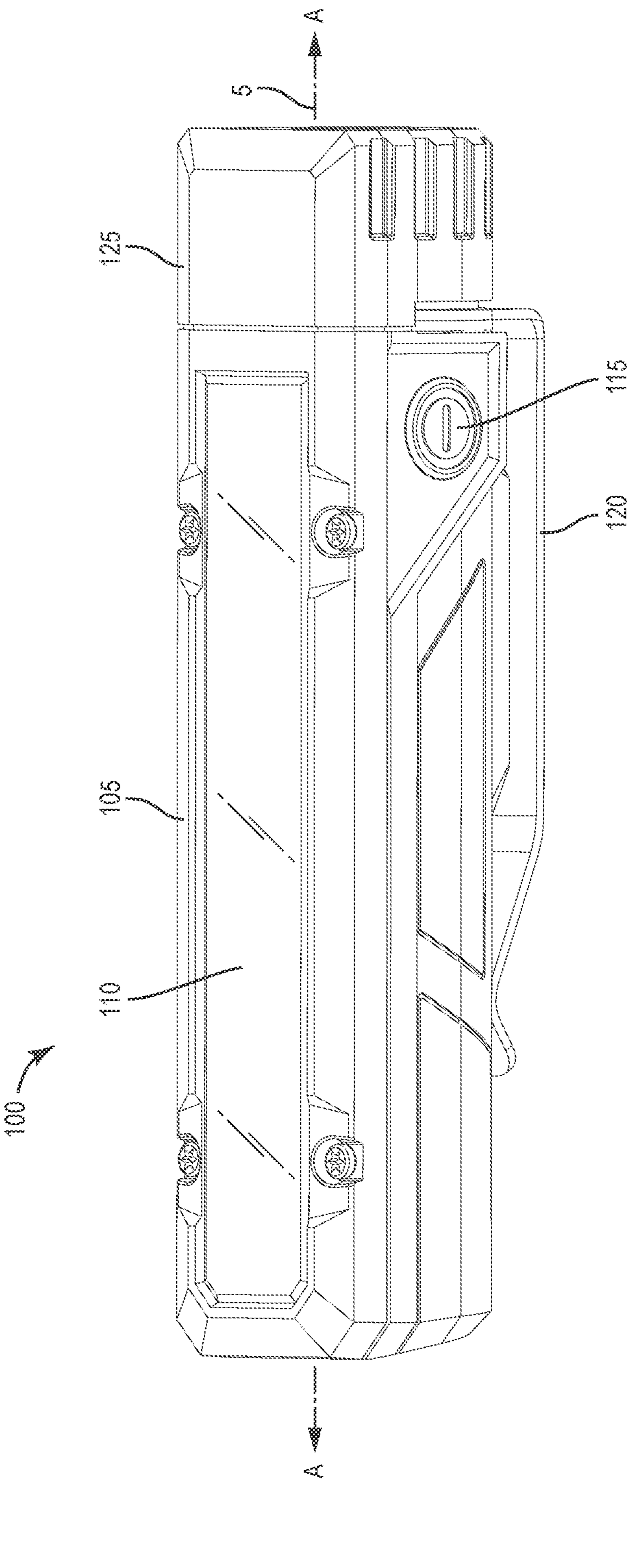
FIG. 1 is a perspective view of a portable lighting device including a light source.

FIG. 1 illustrates a portable lighting device 100, such as a personal floodlight or flashlight, including a housing 105, a light source 110, a power button 115, and a clip 120. The housing 105 has a generally elongated cuboidal shape and with a rectangular or square cross-section. The housing 105 defines a central longitudinal axis A extending through opposing ends of the housing 105. In other embodiments, the housing 105 may be configured as other geometric shapes. The housing 105 supports and encloses the other components of the lighting device 100.

Figure 2:
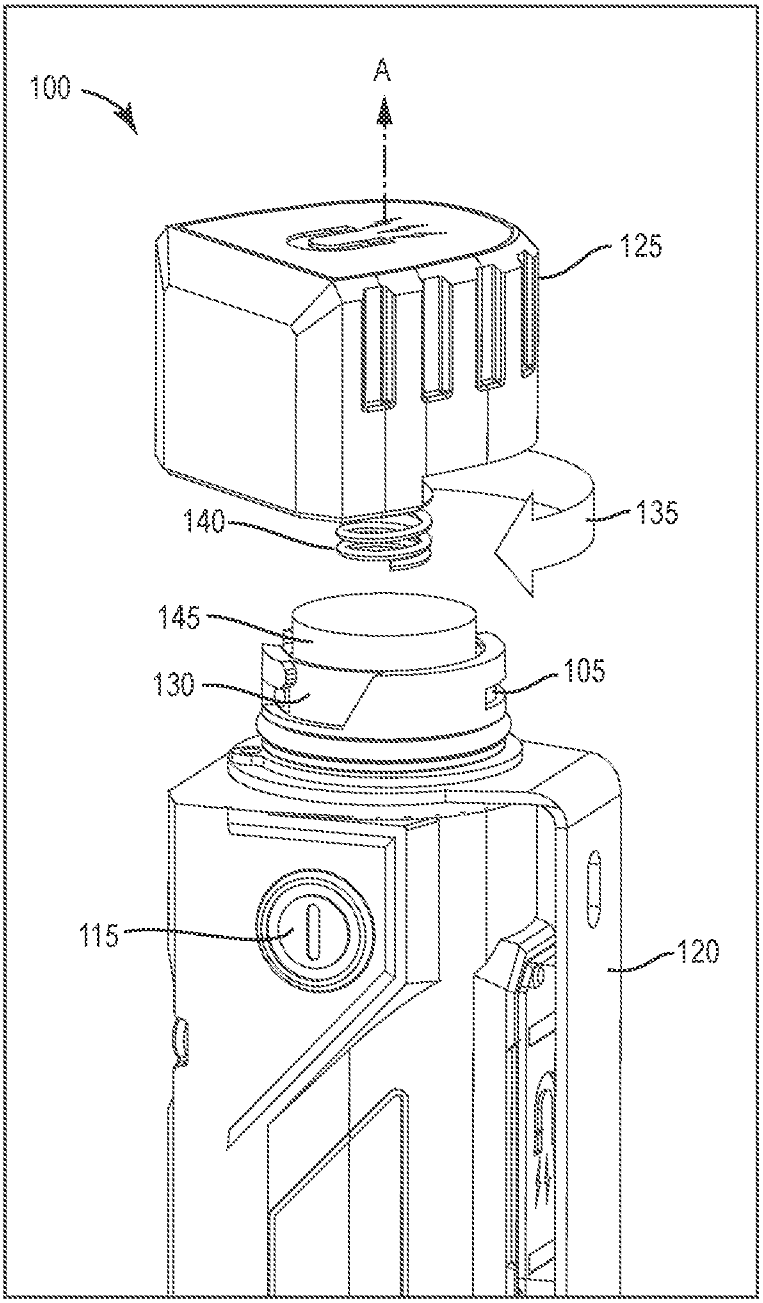
FIG. 2 is an end perspective view of the lighting device with a battery cap removed.

Referring to FIG. 2, the housing 105 includes a battery cap 125 at one end of the lighting device 100. The battery cap 125 is selectively removable from the remainder of the housing 105 via a locking mechanism 130. In the illustrated embodiment, the locking mechanism 130 is a bayonet-style locking mechanism, allowing the battery cap 125 to removably couple to the housing 105 via a clockwise or counterclockwise twisting motion (e.g., in the direction of arrow 135). When coupled to the remainder of the housing 105, the battery cap 125 encloses a power source 145 (e.g., a battery or battery pack) for powering the lighting device 100. The battery cap 125 further includes a biasing element 140. In the illustrated embodiment, the biasing element 140 is a coil spring, although other types of biasing elements may also or additionally be used. When the battery cap 125 is coupled to the housing 105 via the locking mechanism 130, the biasing element 140 compresses and applies a force along the longitudinal axis A on the power source 145. The force helps maintain the power source 145 in proper electrical connection with electrical contacts within the housing 105 to operate the light source 110.

Figure 3:
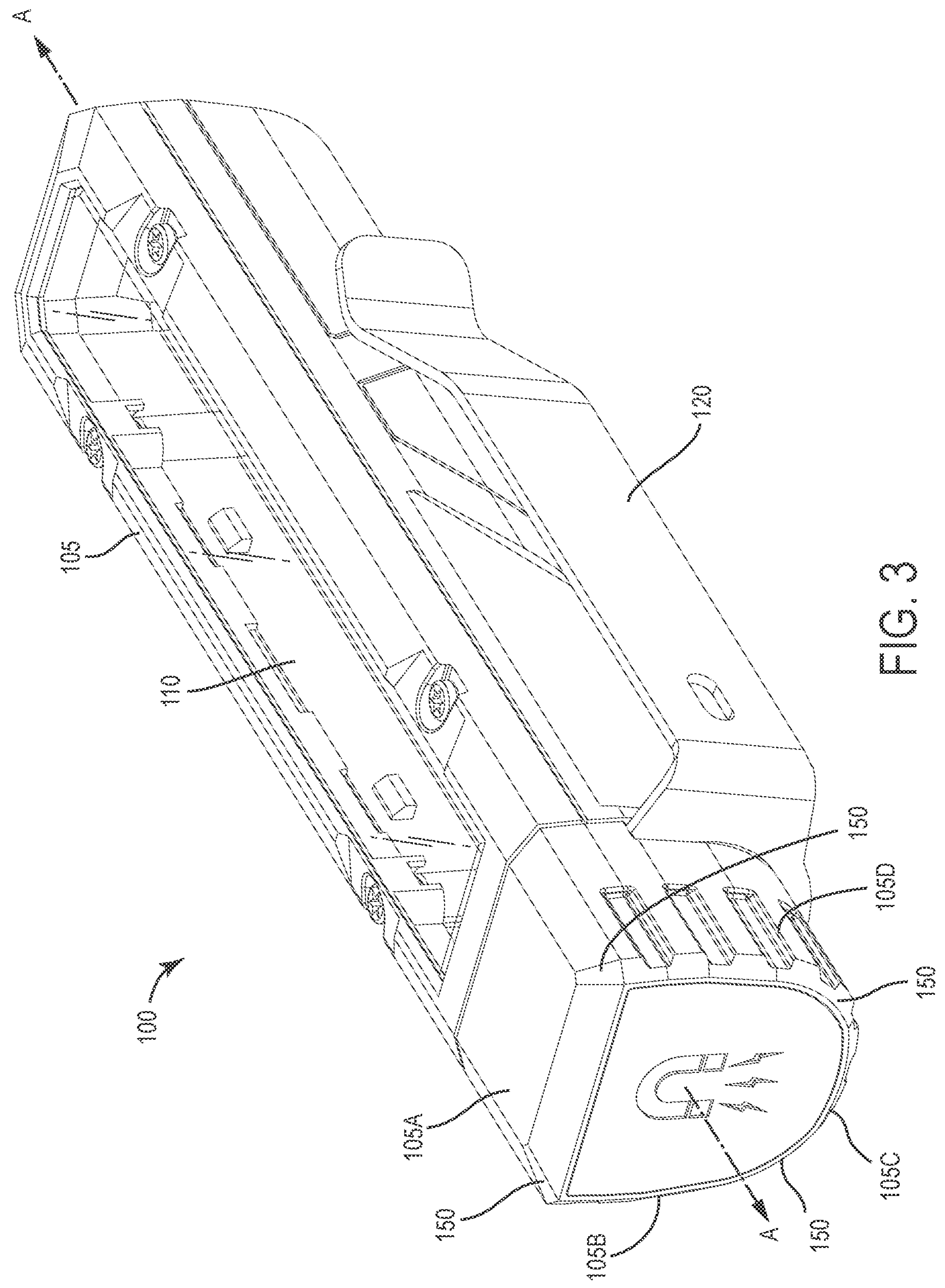
FIG. 3 is a perspective view of the lighting device positioned on a support surface in a first configuration.

Referring to FIG. 3, the housing 105 also includes a plurality of longitudinally-extending surfaces 105A, 105B, 105C, 105D arranged around the longitudinal axis A. The surfaces 105A-105D extend generally parallel to the longitudinal axis A and meet at corner areas 150 to form the generally elongated cuboid shape of the housing 105. In the illustrated embodiment, the corner areas 150 are configured as slanted edges disposed on the housing 105 along each of the four longitudinal edges parallel to the longitudinal axis A. The surfaces 105A-105D are oriented at different angles relative to each other to support the lighting device 100 at different orientations. For example, the lighting device 100 may be positioned on a support surface (e.g., a table) with a different one of the surfaces 105A-105D resting on the support surface to direct light from the light source 110 in various directions. Although the illustrated housing 105 includes four longitudinal-extending surfaces 105A-105D arranged at different angles, in other embodiments the housing 105 may include fewer or more longitudinally-extending surfaces.

Figure 5:
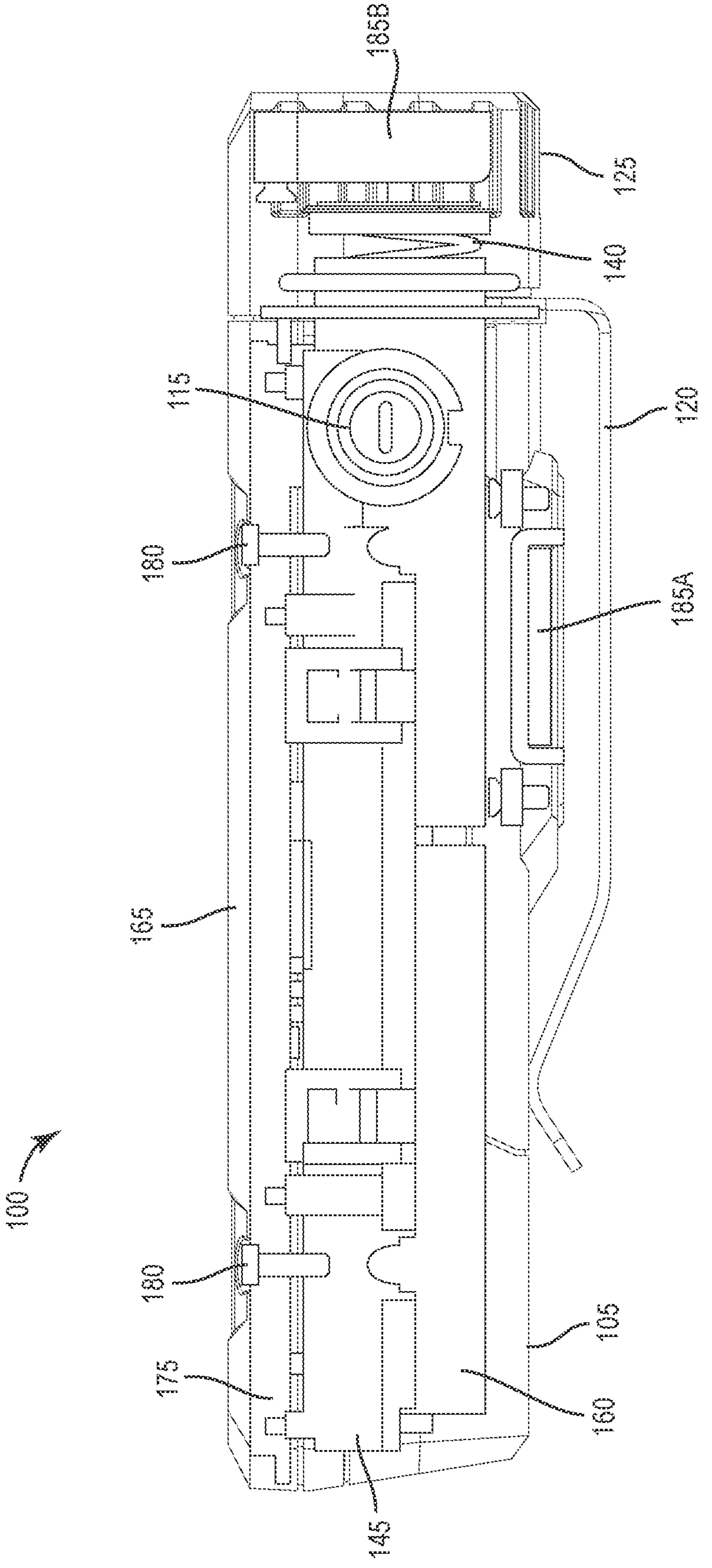
FIG. 5 is a cross-sectional view of the lighting device taken along section line 5-5 of FIG. 1.

FIG. 5 illustrates various internal lighting components comprising the lighting device 100. The housing 105 encases a carrier 160, which receives the power source 145. The housing 105 is held together around the carrier 160 by threaded fasteners 180 (e.g., screws). In other embodiments, other suitable fastening means, such as a snap-fit housing assembly and/or adhesives, may be used to assemble the housing 105.

Figure 6:
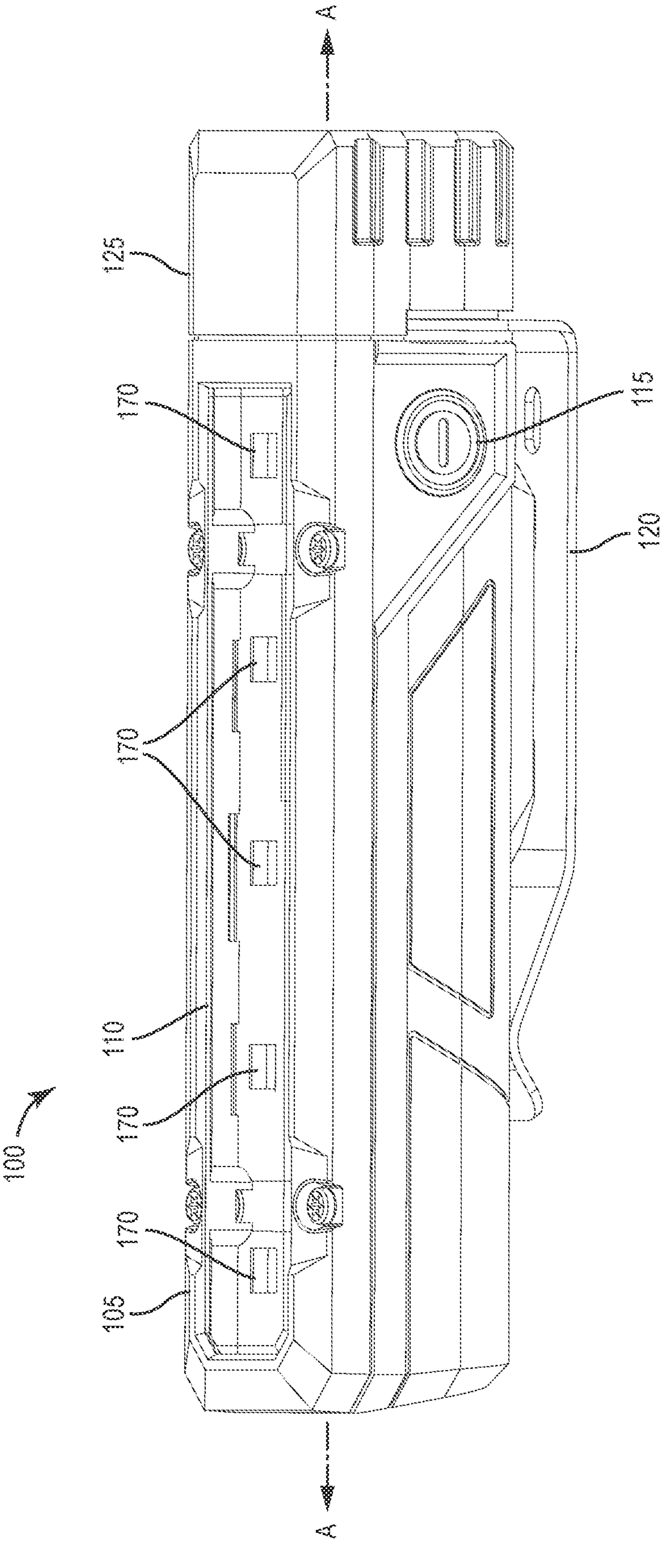
FIG. 6 is a perspective view the lighting device with a lens of the light source removed.
Figure 9:
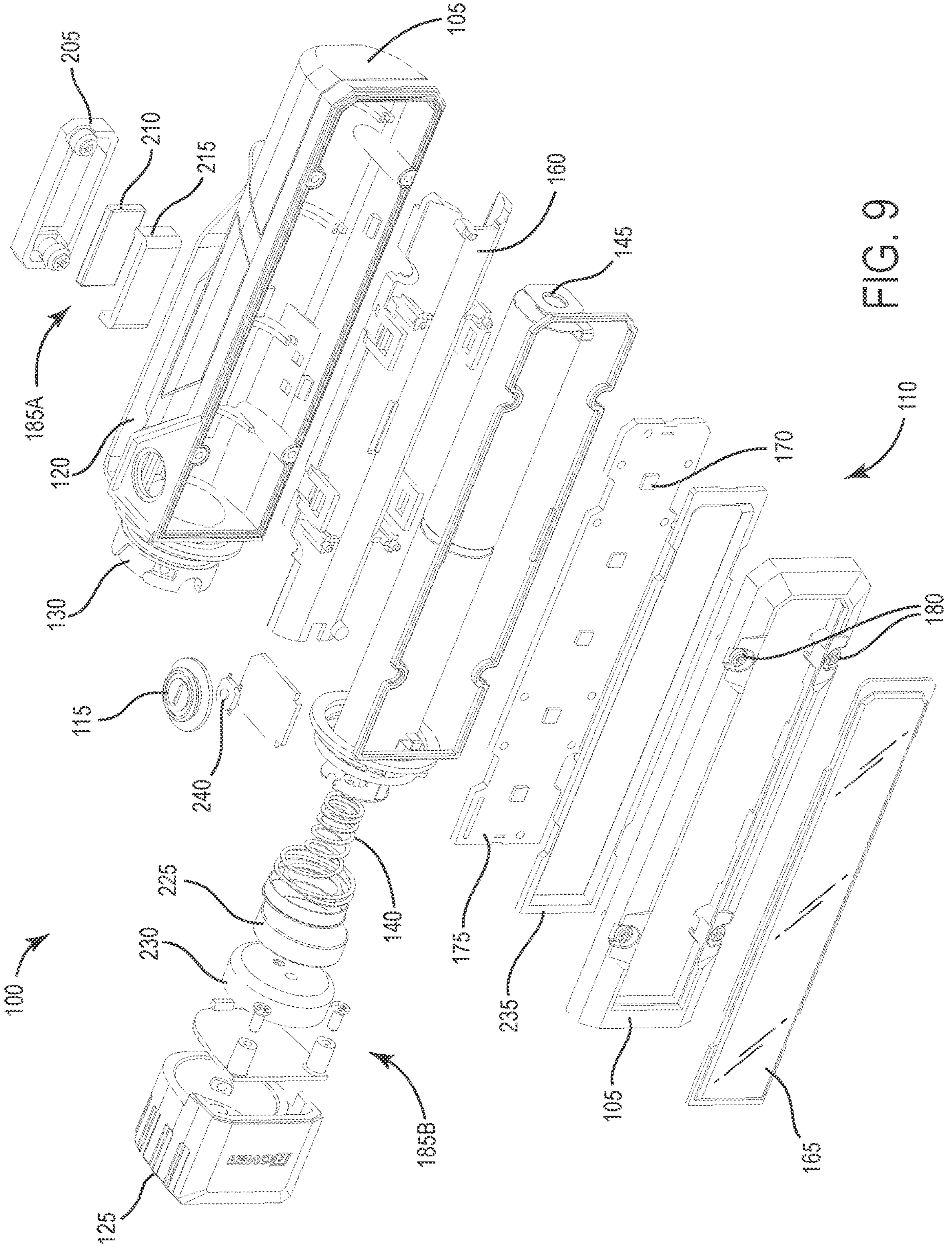
FIG. 9 is another exploded view of the lighting device.

As shown in FIGS. 5, 6, and 9, the light source 110 is supported by the housing 105 and configured to emit light in an outward direction that is normal to the longitudinal axis A. In other embodiments, the light source 100 may emit light along the direction of the longitudinal axis A or in various other directions relative the housing 105. The light source 110 includes a lens 165 and a plurality of light emitting elements 170. In the present embodiment, the lens 165 is a clear, injection molded plastic piece with a light refraction index that enhances the transmission of light emitted by the light emitting elements 170. In other embodiments, other materials may be used as the lens 165 to achieve different refraction indexes and different transmission factors.

The illustrated light emitting elements 170 are light emitting diodes (LEDs). In the illustrated embodiment, the light source 110 includes five LEDs 170 (shown in FIG. 6) disposed on a printed circuit board (PCB) 175. In other embodiments, the light source 110 may include fewer or more light emitting elements, and/or may include different types of light emitting element (e.g., florescent bulbs, incandescent bulbs, etc.). For example, in some embodiments, the lighting device 100 may be a personal flashlight that only includes one LED. In the present embodiment, the LEDs 170 are driven in synchronism with a relatively constant current or voltage. In other embodiments, the LEDs 170 may be driven separately and with a variable current or voltage.

The PCB 175 is powered by the power source 145 and supplies a variable drive current from the power source 145 to the LEDs 170. In some embodiments, the PCB 175 includes a controller or processor configured to generate a pulse width modulated (PWM) signal that drives the LEDs 170. The controller is operable to vary the PWM duty cycle to adjust the intensities of the LEDs 170 depending on the operation mode (e.g., HIGH mode, LOW mode, etc.) selected by the user via the power button 115. In other embodiments, the PCB or other suitable circuitry may generate different types of signals or drive currents to power the LEDs 170 in different modes. Furthermore, the controller is operable to implement a light optimizing control algorithm that monitors a remaining voltage in the power source 145, which is then used in a control loop to achieve a lumen output that can be supported by the current discharge state of the power source 145. Details of the controller and control algorithm will be described in further detail in the following description.

FIG. 9 shows a reflector 235 disposed between the lens 165 and the PCB 175. The reflector converges or diverges the light emitted by the LEDs 175 such that the lighting device 100 may achieve a desired intensity and output beam angle. The properties of the reflector 235 may be altered in various embodiments to achieve different light output characteristics.

Referring to FIGS. 1 and 9, the power button 115 is supported by the housing 105 and disposed above a switch 240. The switch 240 is electrically coupled between the power source 145 and the light source 110 (more particularly, the PCB 175 of the light source 110). When the power button 115 is depressed, the power button 115 actuates the switch 240 to select an operation mode of the lighting device 100. The selected operation mode is then electrically transmitted and temporarily stored in the PCB 175. Based on the stored operation mode, the PCB 175 executes a control algorithm to drive the LEDs 175 with a drive current from the power source 145. When the power button 115 is depressed, the lighting device 100 cycles between an OFF mode, a HIGH mode, a LOW mode, and back to the OFF mode. If the power button 115 is continuously depressed for an extended period of time exceeding a predetermined time, the lighting device will exit to the OFF mode regardless of the current mode or the next mode in the operation cycle.

Figure 4:
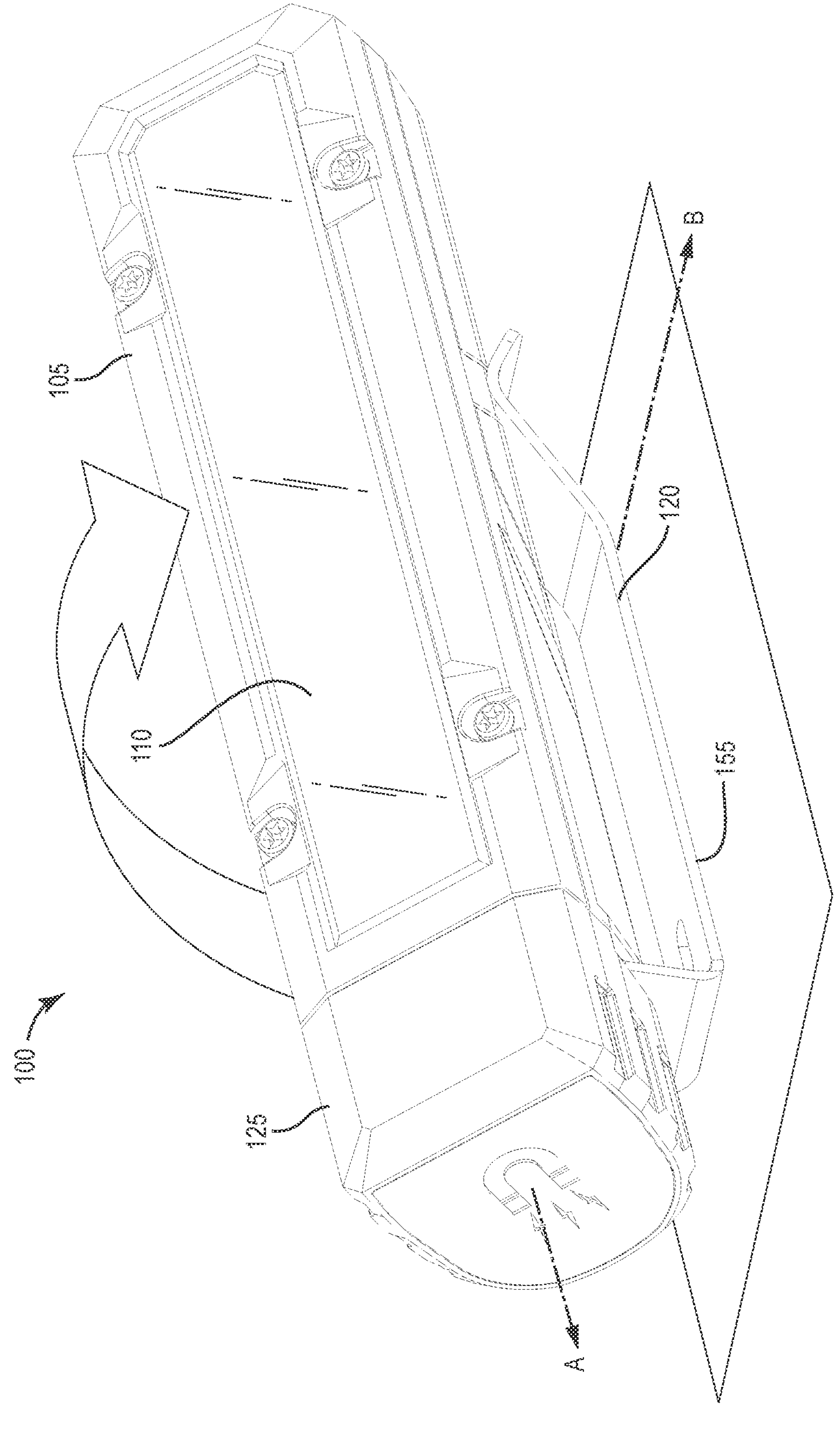
FIG. 4 is a perspective view of the lighting device positioned on the support surface in a second configuration.

As shown in FIGS. 3 and 4, the clip 120 is rotatably coupled to the housing 105. The clip 120 is operable to clip to various objects (e.g., a belt, etc.) to provide added portability and convenience to the lighting device 100. The clip 120 is rotatable about the longitudinal axis A to provide added stability and structural support as a kickstand for the lighting device 100 when the housing 105 rests on one of the longitudinally-extending surfaces 105A-105D (see FIG. 3). The clip 120 also has a substantially flat section 155 that serves as a stand or a resting surface when the clip 120 (instead of one of the longitudinally-extending surfaces 105A-105D) is rotated with respect to the housing 105 to rest on the support surface (see FIG. 4). In this position, the clip 120 supports the entire weight of the lighting device 100 independent of the longitudinally-extending surfaces 105A-105D, allowing the lighting device 100 to rotate while being supported by the clip 120 and to emit light from the light source 110 at different angles determined by the position of the clip 120 relative to the housing 105 as specified by a user.

Figure 7A:
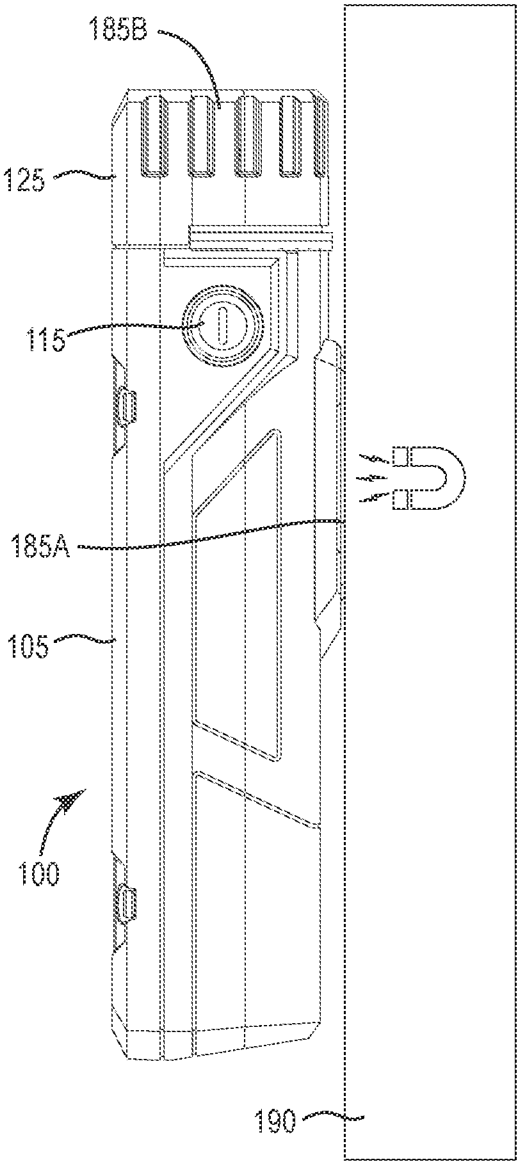
FIGS. 7A-7B illustrate configurations of the lighting device magnetically attached to a magnetic surface.
Figure 7B:
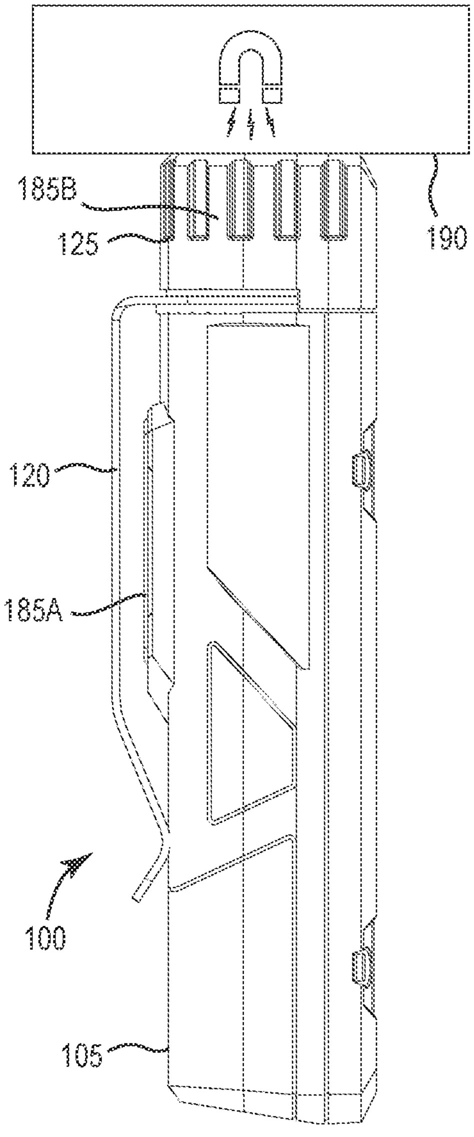
Figure 8:
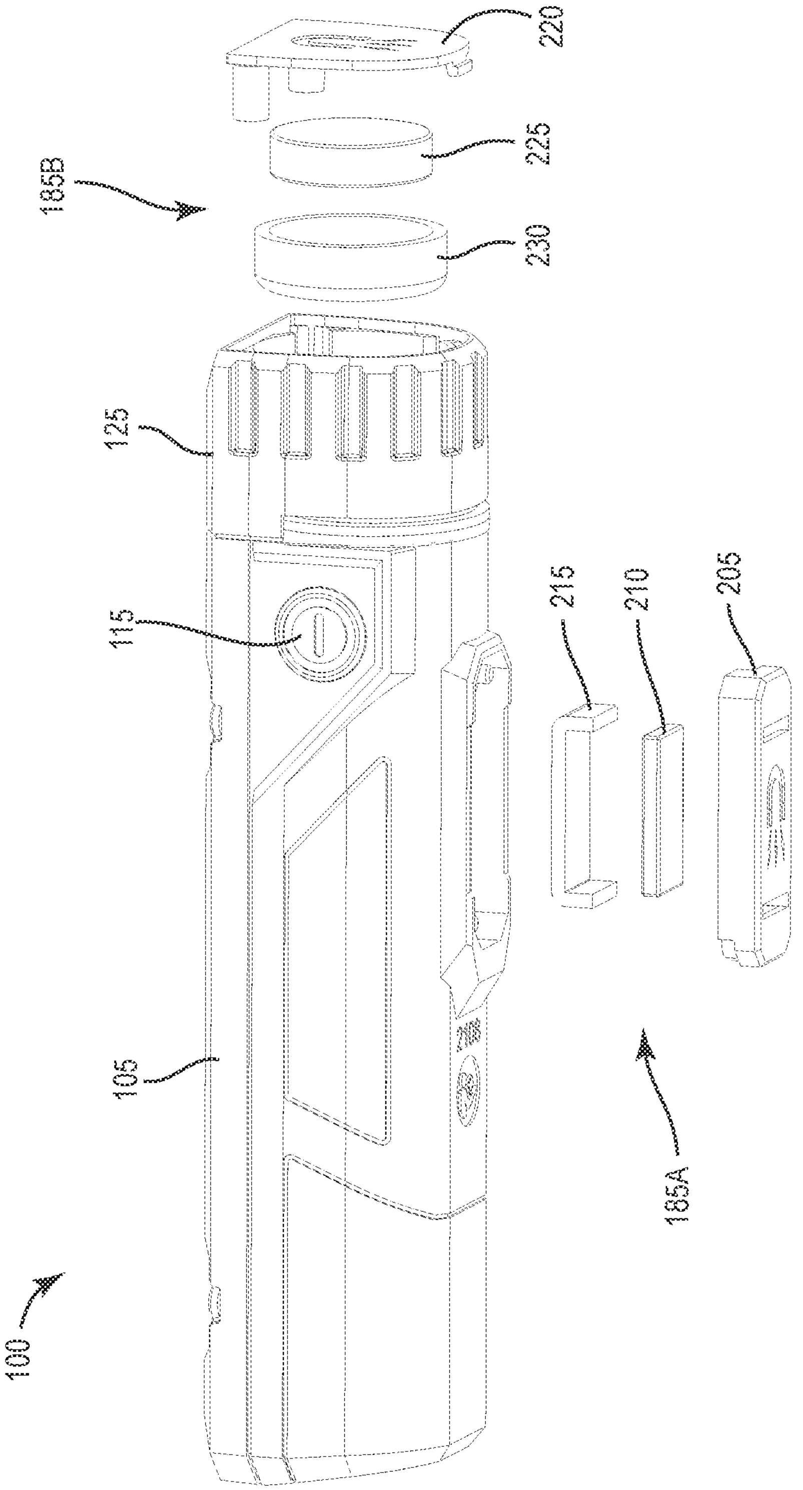
FIG. 8 is an exploded view of the lighting device, illustrating magnetic elements.

As shown in FIGS. 7A, 7B, and 8, the lighting device 100 further includes two magnetic elements 185A, 185B. The first magnetic element 185A is a side magnet disposed on a side of the housing 105 opposite from the light source 110. The second magnetic element 185B is a cap magnet disposed in the battery cap 125. The magnetic elements 185A, 185B are capable of magnetizing and attracting to magnetic surfaces 190. The magnetic faces 185, thereby, allow the lighting device 100 to be conveniently mounted to magnetic surfaces 190 in various orientations. In some embodiments, the first magnetic element 185A, the second magnetic element 185B, or both may be omitted.

FIG. 8 is an exploded view of the magnetic elements 185A, 185B of the lighting device 100. The first magnetic element 185A includes a side magnet cover 205, a first magnet 210, and a side magnetizer 215. The side magnetizer 215 is a permanent magnet that arranges the magnetic domains in the first magnet 210 such that the magnetic field in the first magnet 210 increases. The side magnet cover 205 is configured to cover and hold the first magnet 210 and the side magnetizer 215 within the housing 105 of the lighting device 100. Likewise, the second magnetic element 185B includes a cap magnet cover 220, a second magnet 225, and a cap magnetizer 230. The cap magnetizer 230 is a permanent magnet that arranges the magnetic domains in the second magnet 225 such that the magnetic field in the second magnet 225 increases. The cap magnet cover 220 is configured to cover and hold the second magnet 225 and the cap magnetizer 230 within the battery cap 125 of the lighting device 100. The covers 205, 220 may be made of a relatively softer material than the magnets 210, 225, such as plastic or elastomeric material, so that the covers 205, 220 do not mar the surfaces to which the magnetic elements 185A, 185B are attached.

Figure 17:
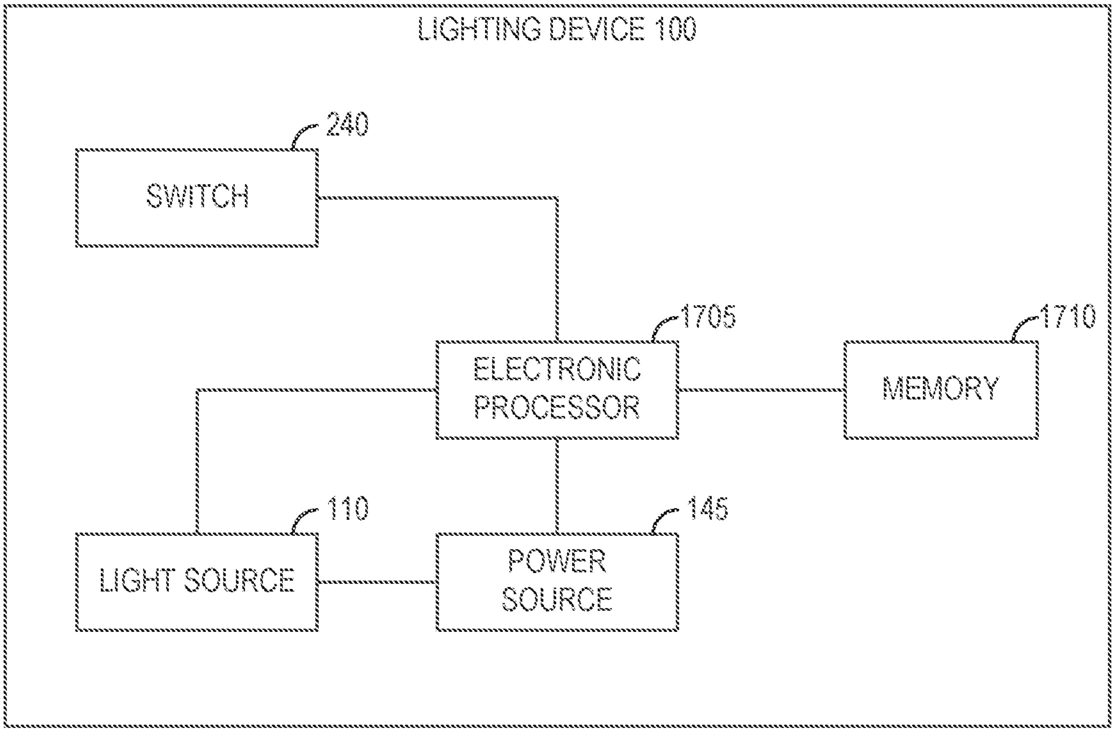
FIG. 17 is a block diagram of the lighting device according to one example embodiment.

FIG. 17 is a block diagram of the lighting device 100 according to one example embodiment. As shown in FIG. 17, the lighting device 100 includes an electronic processor 1705, a memory 1710, the power source 145, the light source 110, and the switch 240. The electronic processor 1705 is electrically coupled to a variety of components of the lighting device 100 and includes electrical and electronic components that provide power, operational control, and protection to the components of the lighting device 100. In some embodiments, the electronic processor 1705 includes, among other things, a processing unit 230 (e.g., a microprocessor, a microcontroller, or another suitable programmable device), a memory, input units, and output units. The processing unit of the electronic processor 1705 may include, among other things, a control unit, an arithmetic logic unit ("ALU"), and a plurality of registers 244. In some embodiments, the electronic processor 1705 is implemented partially or entirely on a semiconductor (e.g., a field-programmable gate array ["FPGA"] semiconductor) chip, such as a chip developed through a register transfer level ("RTL") design process.

In some embodiments, the memory 1710 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The electronic processor 1705 is electrically coupled to the memory 1710 and executes instructions that are capable of being stored in a RAM of the memory 1710 (e.g., during execution), a ROM of the memory 1710 (e.g., on a generally permanent basis), or another non-transitory computer readable medium such as another memory or a disc. The electronic processor 1705 is configured to retrieve from memory and execute, among other things, instructions related to the control processes, algorithms, and methods described herein. The electronic processor 1705 is also configured to store information on the memory 1710 such as current thresholds and voltage thresholds corresponding to various modes of the lighting device 100.

In some embodiments, the power source 145 is coupled to and transmits power to the electronic processor 1705 and to the light source 110. In some embodiments, the power source 145 includes combinations of active and passive components (e.g., voltage step-down controllers, voltage converters, rectifiers, filters, etc.) to regulate or control the power provided to the electronic processor 1705 and/or the light source 110. In some embodiments, the power source 145 is configured to provide a drive current to the light source 110 based on control signals received from the electronic processor 1705 to control an intensity of the light source 110. In other words, an intensity of the light source 110 is dependent on the drive current (i.e., power) received from the power source 145. For example, the electronic processor 1705 is configured to detect a user actuation of the power button 115 by detecting a change in the state of the switch 240. Based on the detected user actuation, the electronic processor 1705 determines an operational mode for the light source 110 (for example, a high current operation mode, a low current operation mode, an off mode, or the like). The electronic processor 1705 then controls the power source 145 to provide a drive current to the light source that corresponds to the selected operational mode. In some embodiments, the electronic processor 1705 is configured to control the drive current provided by the power source 145 to the light source 110 by controlling a pulse width modulation (PWM) duty cycle that controls when the power source 145 provides the drive current to the light source 110.

In some embodiments, one or more of the components shown in FIG. 17 may be located on the PCB 175. In some embodiments, one or more of the components shown in FIG. 17 may be located elsewhere within or on the housing 105 of the lighting device 100. In some embodiments, the lighting device 100 includes additional, fewer, or different components than the components shown in FIG. 17. For example, the lighting device 100 may additionally include a display to indicate an operational mode of the lighting device 100. As another example, the lighting device 100 may include current and/or voltage sensors that measure the current being drawn by the light source 330 (i.e., drive current) and/or the voltage of the power source 315.

Figure 10:
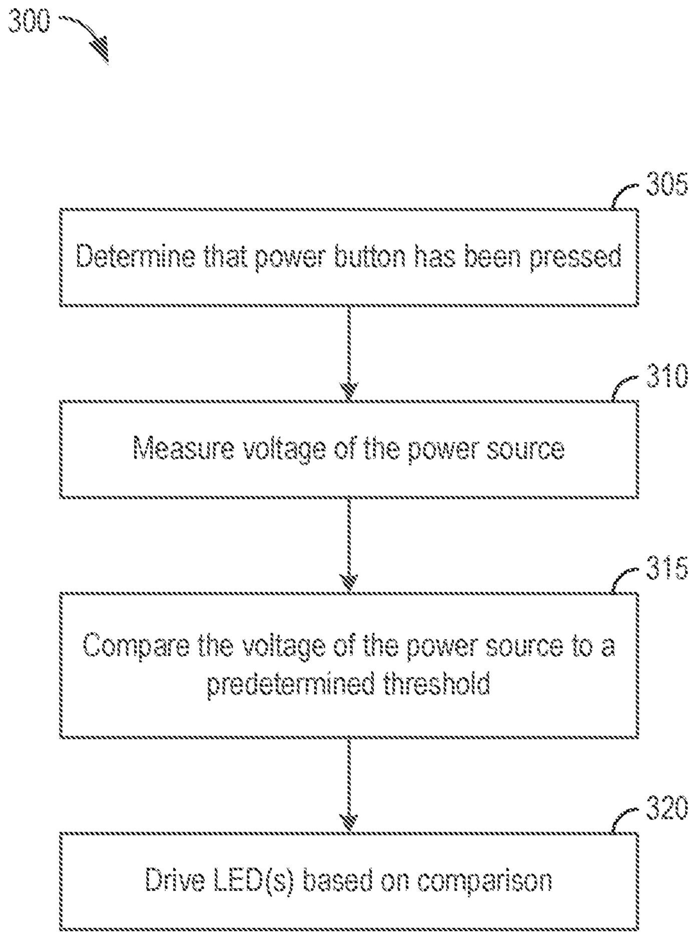
FIG. 10 is a flowchart illustrating a method of operating the lighting device.

FIG. 10 is a flowchart illustrating a method 300 of operating the lighting device 100 that is executed by the electronic processor 1705 according to one example embodiment. When the electronic processor 1705 determines that the power button 115 has been depressed by detecting a change in state of the switch 240 (block 300), the electronic processor 1705 measures a charge remaining in the power source 145 (i.e., a voltage of the power source 145) (block 310). The measured remaining charge is then compared to a predetermined threshold (block 315) to determine whether the lighting device 100 is capable of being operated in the operation mode selected by the power button 115 (block 320). For example, the remaining charge of the power source 145 may indicate whether the power source 145 is able to provide a required amount of drive current to operate the light source 110 in the selected operation mode. If the selected operation mode of the lighting device 100 requires a drive current with a corresponding power source voltage that exceeds the predetermined threshold, the electronic processor 1705 switches to the next mode that requires a lower drive current in the operation cycle. For example, the electronic processor 1705 switches from the HIGH mode to the LOW mode or from the LOW mode to the OFF mode when the charge remaining in the power source 145 (i.e., the voltage of the power source 145) is insufficient to support the drive current of the selected HIGH mode or the selected LOW mode. In other words, the electronic processor 1705 controls the drive current to operate the light source 110 in a lower current operation mode that is different than the selected operation mode (at block 320) in response to determining (at block 315) that the voltage of the power source 145 is less than the predetermined threshold. On the other hand, when the voltage of the power source 145 is determined to be greater than or equal to the predetermined threshold corresponding to a drive current of the selected operation mode (at block 315), the electronic processor 1705 controls the drive current to operate the light source 110 in the selected operation mode (at block 320).

In some embodiments, the power source 145 comprises one or more alkaline batteries (see FIG. 9) received by the carrier 160. When the batteries become partially depleted, the alkaline chemistry changes and increases the internal impedance of the power source 145. Therefore, the lighting device 100 experiences a large voltage drop when attempting to draw full power from a partially depleted power source 145. Although the power source 145 may still have, for example, 50% charge remaining, the large voltage drop resulting from the increased internal impedance may cause the lighting device 100 to prematurely enter the LOW mode due to the charge remaining in the power source 145 decreasing below the predetermined threshold (see block 315 of FIG. 10), which undesirably decreases the intensity of the light outputted by the light source 110 and shortens the operation time in the HIGH mode.

Figure 11:
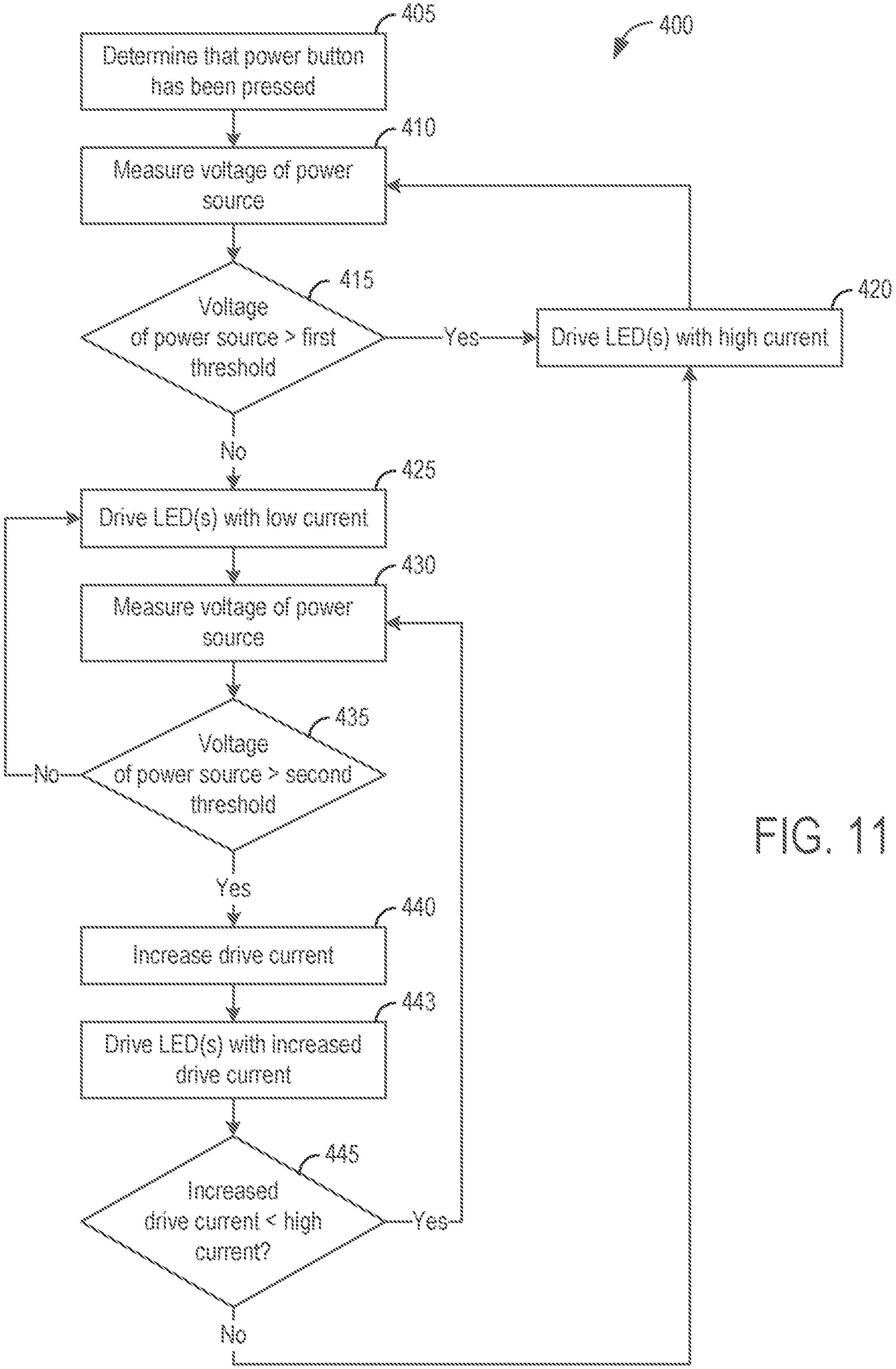
FIG. 11 is a flowchart illustrating a method of operating a ramp-up algorithm for the lighting device according to one embodiment.

In some embodiments, instead of attempting to initially draw full power from a partially depleted power source 145, the electronic processor 1705 executes a ramp-up algorithm 400, as shown in FIG. 11, to incrementally ramp-up the drive current delivered to the LEDs 170 when the power source 145 is partially depleted. With such an arrangement, the light outputted by the light source 110 is more efficiently controlled based on the remaining charge of the power source 145. Such control may extend the life of the of the power source 145 and may improve the performance of the lighting device 100 by avoiding undesirable decreases in the intensity of the light outputted by the light source 110.

Referring to FIG. 11, when the electronic processor 1705 determines that the power button 115 has been depressed by detecting a change in state of the switch 240 (block 405), the electronic processor 1705 executes the ramp-up algorithm 400 and measures the amount of charge remaining in the power source 145 (block 410) before generating a PWM signal to provide a substantially constant drive current/voltage to the LEDs 170. If the measured remaining charge in the power source 145 is above a first voltage threshold (e.g., 2.5 V) signifying more than 50% remaining charge in the power source 145 (decision 415), the LEDs 170 are driven with a high drive current (e.g., 820 mA) to operate the lighting device 100 in the HIGH mode (block 420). The ramp-up algorithm 400 repeats blocks 410-420 to maintain operation in the HIGH mode until the measured remaining charge in the power source 145 is no longer above the first voltage threshold. When the remaining charge in the power source 145 falls below the first voltage threshold or is initially determined to be below the first voltage threshold (at block 415), the power source 145 is considered partially depleted. In response to this determination by the electronic processor 1705 (block 415), the electronic processor 1705 controls the drive current provided by the power source 145 to the LEDs 170 to be a low drive current (e.g., 165 mA) to operate at a “plateau” state (block 425).

In the “plateau” state, the remaining charge in the power source 145 is measured again (block 430). If the measured remaining charge in the power source 145 is not above a second threshold (e.g., 2.3 V) that is lower than the first voltage threshold (decision 435), then the power source 145 is depleted too far to reasonably provide the high drive current necessary for the lighting device 100 to operate in the HIGH mode. Thus, the ramp-up algorithm 400 repeats blocks 425-430 to maintain operation in the “plateau” state. On the other hand, if the measured remaining charge in the power source 145 is above the second voltage threshold (decision 435), then the drive current is increased (block 440), and the electronic processor 1705 controls the power source 145 to drive the LEDs 170 with the increased drive current (at block 443). The electronic processor 1705 then determines whether the increased drive current is less than the high drive current corresponding to the HIGH mode (at block 445). When the drive current is below the high drive current (at block 445), the electronic processor 1705 repeats blocks 425 through 445 until the drive current has increased to be equivalent to or greater than the high drive current (decision 445) at which point the lighting device 100 is operating in the HIGH mode (block 420). In other words, the electronic processor 1705 incrementally increases the drive current provided to the light source 110 from the low drive current of the LOW mode to the high drive current of the HIGH mode when the power source 145 is determined to be partially depleted. By incrementally increasing the drive current for a partially depleted power source 145, the ramp-up algorithm 400 works in conjunction with the mode selection operation of the power button 115 to avoid the large voltage drop mentioned above and inhibit the lighting device 100 from prematurely dropping from the HIGH mode to the LOW mode.

Figure 12:
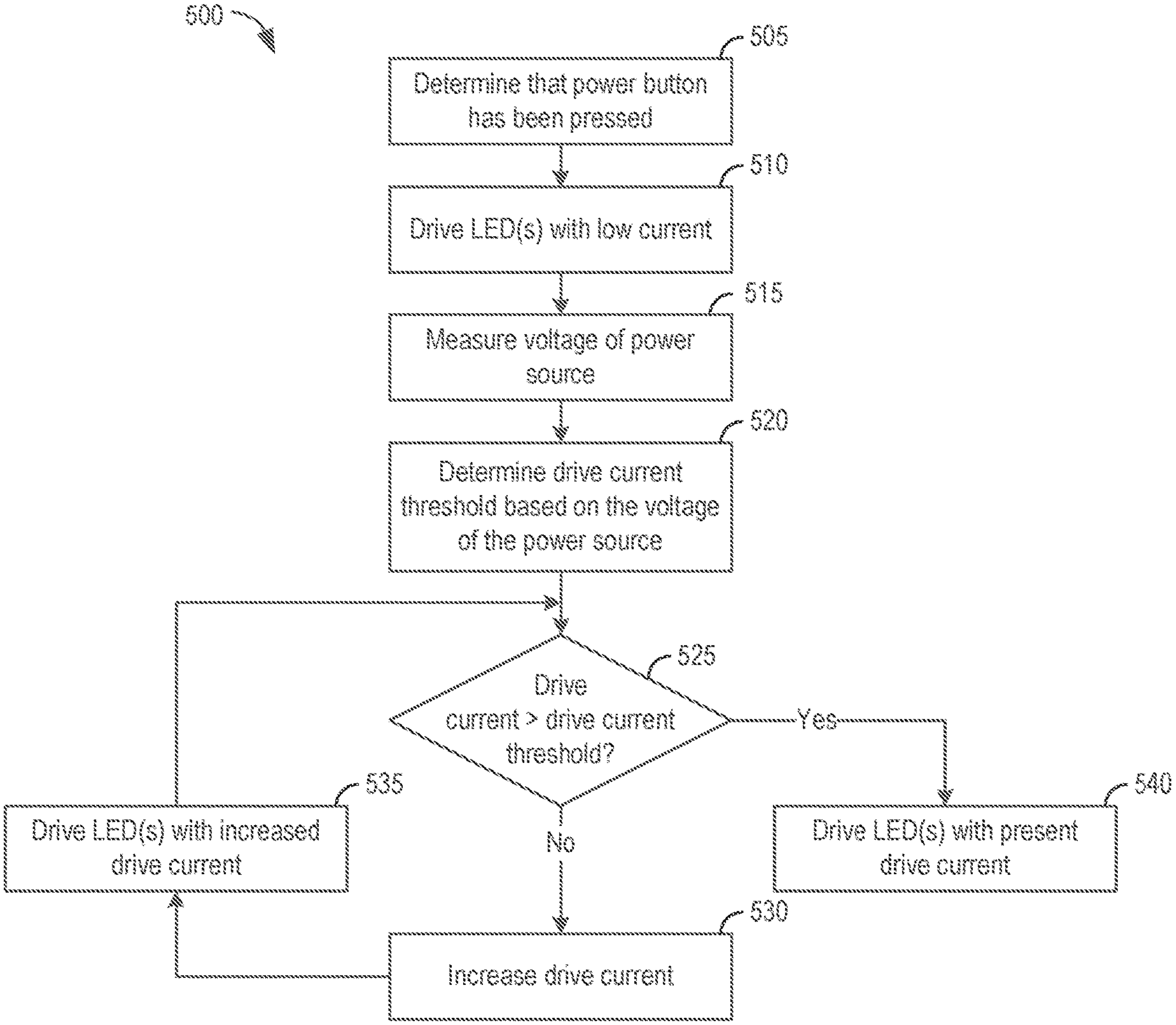
FIG. 12 is a flowchart illustrating a method of operating a ramp-down algorithm for the lighting device according to one embodiment.

In another embodiment, the lighting device 100 executes a ramp-up algorithm 500 as shown in FIG. 12. When the electronic processor 1705 determines that the power button 115 has been depressed by detecting a change in state of the switch 240 (block 505), the electronic processor 1705 controls the drive current provided by the power source 145 to the LEDs 170 to be a low drive current regardless of the remaining charge available in the power source 145 such that the lighting device 100 is operated in the LOW mode (block 510). The electronic processor 1705 subsequently measures the remaining charge in the power source 145 (block 515). Based on the measured remaining charge, the electronic processor 1705 determines a maximum light output that the lighting device 100 can reasonably achieve and determines a drive current threshold based on the selected light output (block 520). In other words, the electronic processor 1705 determines a drive current threshold based on the measured voltage of the power source 145 (at block 520). For example, the electronic processor 1705 may access a look-up table in the memory 1710 that includes corresponding drive current thresholds for a plurality of voltages or voltage ranges of the power source 145. In some embodiments, the look-up table includes corresponding drive current thresholds for a plurality of maximum light output values of the light source 110. As another example, the electronic processor 1705 may be programmed to use the measured voltage of the power source 145 as a variable in a stored formula that is used to calculate the drive current threshold.

Continuing the explanation of the method 500, as long as the present drive current provided to drive the LEDs 170 does not exceed the drive current threshold (decision 525), the ramp-up algorithm 500 increases the present drive current (block 530) and drives the LEDs 170 with the increased drive current (block 535) so that the intensity of the light emitted by the lighting device 100 is increased. Decision 525 and blocks 530-535 are repeated until the present drive current provided to drive the LEDs 170 exceeds the drive current threshold (at block 525), signifying that the selected maximum light output is achieved. At this point, the ramp-up algorithm 500 ceases increasing of the drive current and drives the LEDs 170 with the present drive current to maintain the determined maximum light output (block 540). By executing the method 500, the electronic processor 1705 incrementally increases the drive current provided to the light source 110 from a low drive current of the LOW mode to a higher drive current that can be reasonably provided by the power source 145 based on its measured remaining charge. Such control may avoid the large voltage drop mentioned above and inhibit the lighting device 100 from prematurely dropping from the HIGH mode to the LOW mode due to the power source 145 being partially depleted.

In alternate embodiments of the ramp-up algorithm 500, block 510 of FIG. 12 may be excluded. For example, after the power button 115 is initially pressed (block 505), a remaining charge in the power source 145 is measured (block 515) and used to select a maximum light output and determine a drive current threshold (block 520) before a drive current is provided to drive the LEDs 170. In such embodiments, the lighting device 100 allows ramping up of the emitted light intensity from the OFF mode as opposed to the LOW mode.

It should be understood that in some embodiments, the ramp-up algorithms 400, 500 may incrementally increase the drive current in a predetermined number of steps (e.g., ten steps) such that execution of each step increases the drive current by a predetermined amperage (e.g., 100 mA). In other embodiments, the ramp-up algorithm 400, 500 may execute a continuous function increase such that the drive current is continuously increased over time with zero or infinite number of steps. Other methods of increasing the drive current in the ramp-up algorithm 400, 500 are possible to achieve the same purpose and are not exhaustively detailed herein. Additionally, although not shown in separate blocks in FIGS. 12 and 13, in some embodiments, the electronic processor 1705 delays a predetermined time period (e.g., ten milliseconds, fifty milliseconds, five hundred milliseconds, etc.) between driving the LEDs 170 with the increased drive current (blocks 443 and 535) and comparing the drive current to a threshold value (blocks 445 and 525).

The lighting device 100 may also implement a ramp-down algorithm according to some embodiments. The ramp-down algorithm may be implemented by the electronic processor 1705 to slowly decrease the drive current and the corresponding lumen output of the light source 110 according to a function of time, a function of the remaining charge in the power source 145, or a function of both time and remaining charge. After a steady drive current is set, for example in accordance with one of the ramp-up algorithms 400, 500 explained above, and the lighting device 100 operates in accordance with the steady drive current for a predetermined period of time, the lighting device 100 may execute the ramp-down algorithm until reaching a power-off voltage threshold. In some embodiments, the power-off voltage threshold for the lighting device 100 is 2.8 V.

Figure 13:
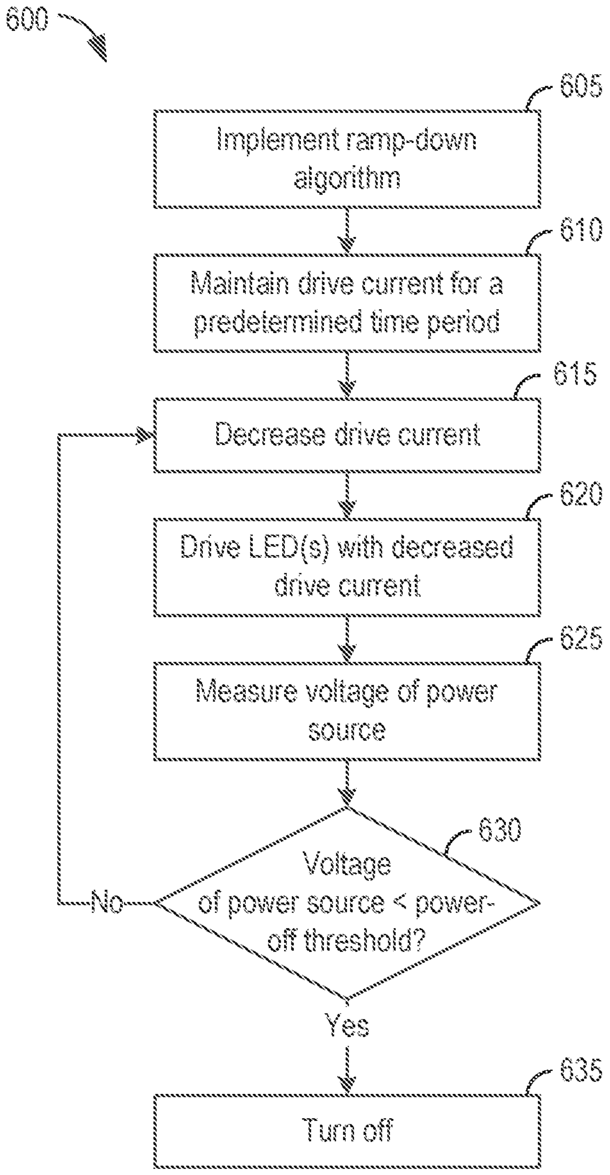
FIG. 13 is a flowchart illustrating another method of operating a ramp-down algorithm for the lighting device.

FIG. 13 is a flowchart illustrating one embodiment of a ramp-down algorithm 600 implemented by the electronic processor 1705 to decrease the drive current provided by the power source 145 to the light source 110 as a function of time. After the lighting device 100 achieves either the operation mode selected by the power button 115 or the highest possible lumen output from execution of the ramp-up algorithms 400 or 500, the electronic processor 1705 implements the ramp-down algorithm 600 (block 605). The electronic processor 1705 initially maintains the drive current for a relatively short predetermined time period (e.g., forty-five seconds) (block 610), during which the duty cycle of the PWM signal provided to the LEDs 170 is held at a constant high percentage in accordance with a ramped up drive current determined by a previously-executed algorithm 400 or 500 (e.g., 100% if the HIGH mode is selected and achieved). After the initial time period has lapsed, the electronic processor 1705 decreases the drive current by reducing the percentage of the PWM duty cycle provided to the LEDs 170 (block 615). The electronic processor 1705 controls the power source 145 to drive the LEDs 170 with the decreased drive current (block 620). The electronic processor 1705 measures the remaining charge in the power source 145 (block 625) and compares the remaining charge in the power source 145 to a power-off threshold (decision 630). If the measured remaining charge falls below the power-off threshold (e.g., 2.8 V), the power source 145 has been depleted beyond a reasonable operating range and, in response, the electronic processor 1705 controls the power source 145 to cease providing drive current to the light source 110 which will accordingly cease outputting light (i.e., operate in the OFF mode) (block 635). Otherwise, the electronic processor 1705 repeats blocks 615-625 and decision 630 until the measured remaining charge in the power source 145 falls below the power-off threshold, and, in response, turns the lighting device 100 off (block 635).

By repeating blocks 615-630, the electronic processor 1705 decreases the drive current provided to the light source 110 over a relatively long time interval (e.g., five minutes, sixty minutes, etc.) such that the light output by the light source 110 gradually decreases in intensity. Although not shown in FIG. 13, in some embodiments, the electronic processor 1705 delays a predetermined time period (e.g., thirty seconds, one minute, five minutes, etc.) between driving the LEDs 170 with the decreased drive current (block 620) and comparing the decreased drive current to the power-off threshold (block 630). In some embodiments, the electronic processor 1705 ramps down the drive current provided to the light source 110 (by repeating blocks 615-630) over a plurality of time stages as explained the below example with five time stages. For example, the electronic processor 1705 is configured to decrease the drive current such that the drive current reaches a respective predetermined value at the end of each time stage. Continuing this example, the electronic processor 1705 may determine a present drive current at the beginning of a time stage and may determine a desired decreased drive current for the end of the time stage. The electronic processor 1705 may then determine the number of times that the drive current is to be decreased and an amount by which to decrease the drive current each time to reach the desired decreased drive current by the end of each time stage.

In an example implementation of the ramp-down algorithm 600, the ramp-down process is divided into five time stages. In the first time stage, the electronic processor 1705 maintains the drive current provided to drive the LEDs 170 at 100% PWM duty cycle for a time period of ninety seconds (block 610). In other words, the electronic processor 1705 controls the drive current to operate the light source 110 in the HIGH mode for ninety seconds. In the second time stage, the drive current is reduced to 47.0% PWM duty cycle over a time interval of 3.7 minutes (block 615) and the LEDs 170 are driven by the drive current (block 620). For example, the electronic processor 1705 may incrementally decrease the PWM duty cycle by approximately 11% every thirty seconds until the PWM duty cycle is 47%. Upon the PWM duty cycle reaching 47%, the electronic processor 1705 maintains the PWM duty cycle at 47% until the end of the time stage (i.e., until 3.7 minutes has passed). As another example, the electronic processor 1705 reduces the PWM duty cycle from 100% to 47% at the beginning of the time stage and maintains the PWM duty cycle at 47% for the duration of the second time stage such that the LEDs 170 are driven at 47.0% PWM drive current over the 3.7 minutes. During this time interval, the electronic processor 1705 measures a remaining charge in the power source 145 (block 625) and compares the measured remaining charge to a power-off threshold of 2.8 V (decision 630). If the measured remaining charge in the power source 145 falls below 2.8 V at any time within the 3.7 minutes, the electronic processor 1705 controls the power source 145 to cease providing drive current to the light source 110 which will put the lighting device 100 in the OFF mode (block 635). Otherwise, the lighting device 100 enters the third stage, wherein a ramp-down process similar to that described above for the second time stage is repeated for the third time stage. In the third time stage, the drive current is further reduced to 20.6% PWM duty cycle over a time interval of twenty minutes (block 615) such that the LEDs 170 are driven at 20.6% PWM drive current by the end of the third stage or over the duration of the third time stage (block 620). The remaining charge in the power source 145 is measured (block 625) and compared to the power-off threshold of 2.8 V (decision 630) to determine whether the lighting device 100 should enter the OFF mode (block 635). If the remaining charge in the power source 145 is still above the power-off threshold at the end of the third time stage (decision 630), the lighting device 100 enters the fourth time stage. In stage four, electronic processor 1705 reduces the PWM duty cycle over a time interval of 4.8 minutes (block 615) until the LEDs 170 are driven with a drive current of 125 mA by the end of the fourth time stage or over the duration of the fourth time stage (block 620). As long as the measured remaining charge in the power source 145 (block 625) does not fall below the power-off threshold (decision 630), the electronic processor 1705 will continue to execute the ramp-down algorithm 600 by entering the fifth time stage and remain powered on. In the fifth time stage, the electronic processor 1705 controls the PWM duty cycle to maintain the drive current at 125 mA (block 620) until the measured remaining charge reaches the power-off threshold (decision 630), thereby turning off the lighting device 100 in response (block 635). It should be understood that the number of time stages, the PWM percentages and current values, the time values, and the power-off threshold value detailed in the above example of the ramp-down algorithm 600 are examples and may vary in other embodiments.

Figure 14:
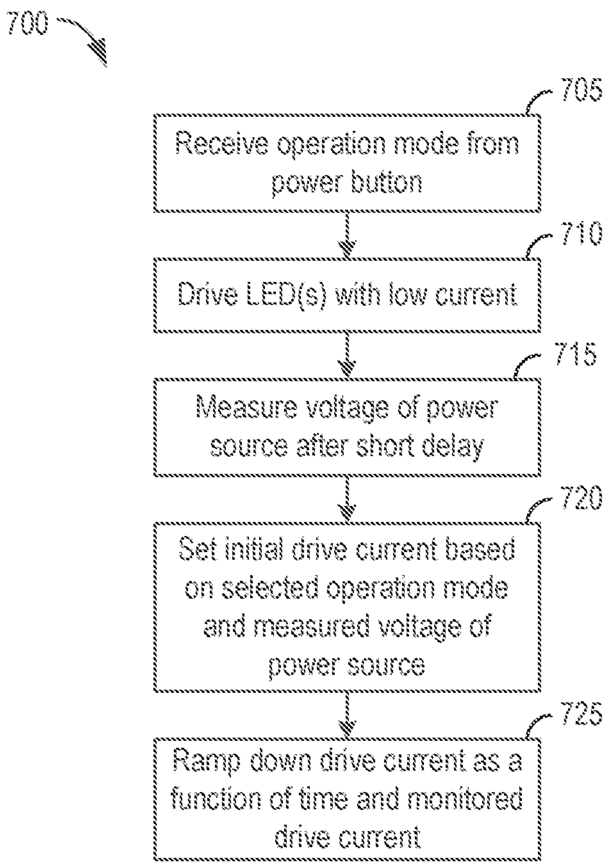
FIG. 14 is a flowchart illustrating another method of operating a ramp-down algorithm after setting an initial drive current based on a selected operation mode for the lighting device.

FIG. 14 illustrates another ramp-down algorithm 700 where the electronic processor 1705 determines an initial drive current to be delivered to the LEDs 170 based on the operation mode selected by the power button 115 before ramping down the drive current based on a function of time and monitored drive current provided to the LEDs 170. After determining the operation mode of the lighting device 100 from user input of the power button 115 by detecting a change in state of the switch 240 (block 705), the electronic processor 1705 controls the drive current to operate the light source 110 in a low current operation mode (e.g., a drive current of 100 mA) (block 710). After a short delay (e.g., fifty milliseconds), the electronic processor 1705 measures the remaining charge in the power source 145 (block 715). Based on the measured remaining charge and the selected operation mode of the lighting device 100, the electronic processor 1705 determines an initial drive current to deliver to the LEDs 170 (block 720).

For example, when the HIGH mode is selected by the power button 115, if the measured remaining charge in the power source 145 is greater than 2.9 V, the electronic processor 1705 controls the drive current to be 820 mA (e.g., by controlling a PWM signal that controls when the power source 145 provides power to the light source 110 as described above). If the measured remaining charge in the power source 145 is between 2.8 V and 2.9 V, the electronic processor 1705 controls the drive current to be 500 mA. If the measured remaining charge in the power source 145 is between 2.7 V and 2.8 V, the electronic processor 1705 controls the drive current to be 400 mA. If the measured remaining charge in the power source 145 is between 2.5 V and 2.7 V, the electronic processor 1705 controls the drive current to be 300 mA. If the measured remaining charge in the power source 145 is lower than 2.5 V, the electronic processor 1705 controls the drive current to be 250 mA until the power source 145 drops below the power-off voltage (e.g., 1.75 V), at which point the electronic processor 1705 controls the lighting device 100 to turn off.

On the other hand, when the LOW mode is selected by the power button 115, if the measured remaining charge in the power source 145 is greater than 2.3 V, the electronic processor 1705 controls the drive current to be 300 mA. Otherwise, if the measured remaining charge in the power source 145 is lower than 2.3 V, the electronic processor 1705 controls the drive current to be 180 mA until the power source 145 drops below the power-off voltage (e.g., 1.75 V), at which point the electronic processor 1705 controls the lighting device 100 to turn off.

Figure 15:
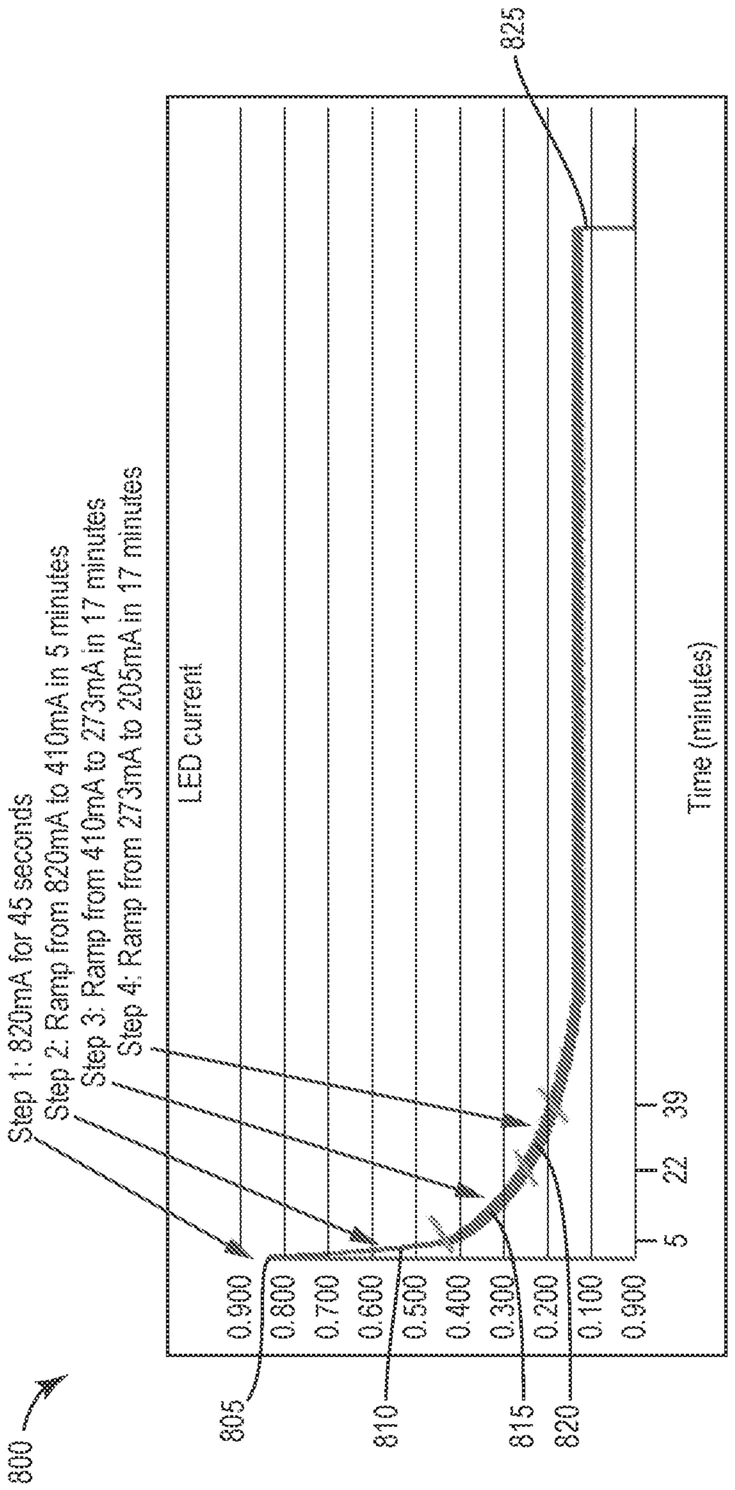
FIG. 15 is a graph of the LED current during execution of the ramp-down algorithm of FIG. 14 when the lighting device is operating in the HIGH mode.
Figure 16:
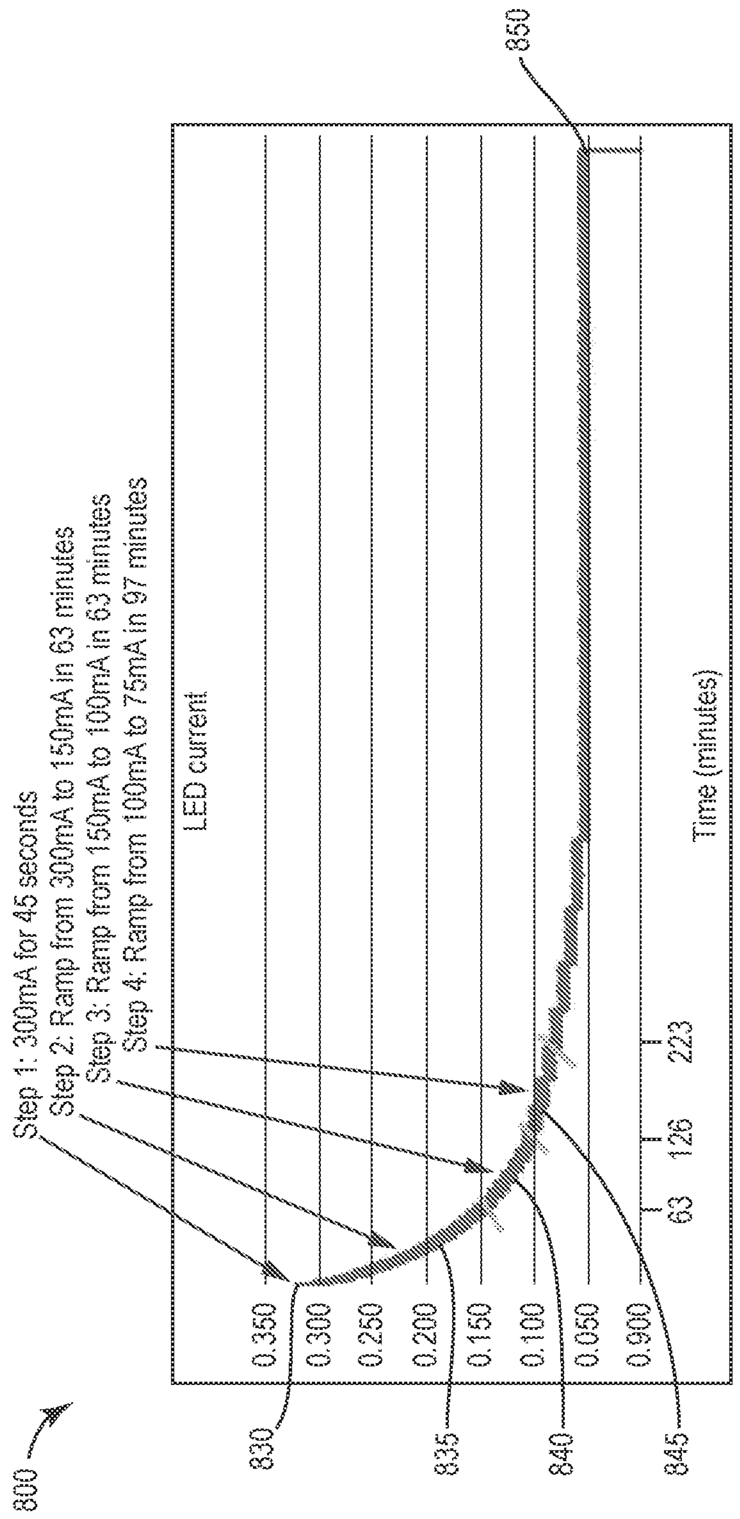
FIG. 16 is a graph of the LED current during execution of the ramp-down algorithm of FIG. 14 when the lighting device is operating in the LOW mode.

Once the initial drive current is determined and set by the electronic processor 1705 (block 720), the electronic processor 1705 ramps down the drive current (block 725), for example, as a function of time and monitored drive current delivered to the LEDs 170. In some embodiments, the electronic processor 1705 ramps down the drive current in a similar manner as described above with respect to FIG. 13. For example, the electronic processor 1705 may ramp down the drive current throughout a process of four time stages when the initial drive current corresponds to either of the HIGH mode or the LOW mode. However, unlike turning off the lighting device 100 based on a monitored voltage of the power source 145 as explained above (block 630 of FIG. 13), during the final time stage of the algorithm 700, the electronic processor 1705 may maintain the PWM duty cycle that controls the drive current at a constant value until the monitored drive current decreases below a low drive current threshold (e.g., 130 mA). In some situations, such a decrease in drive current may occur despite the PWM duty cycle being maintained at a constant value due to partial depletion of the power source 145. FIGS. 15 and 16 illustrate examples of the electronic processor 1705 ramping down the drive current in accordance with the above explanation of block 725 of FIG. 14.

FIG. 15 shows a graph of the LED current (i.e., drive current) during execution of the ramp-down algorithm 700 when the lighting device 100 is operating in the HIGH mode. In the first time stage 805, the electronic processor 1705 maintains the drive current provided to drive the LEDs 170 at 820 mA for a time period of forty-five seconds. In other words, the electronic processor 1705 controls the drive current to operate the light source 110 in the HIGH mode for forty-five seconds. In the second time stage 810, the electronic processor 1705 reduces the drive current provided to the LEDs 170 from 820 mA to 410 mA over a time interval of approximately 5 minutes. In the third time stage 815, the electronic processor 1705 reduces the drive current provided to the LEDs 170 from 410 mA to 273 mA over a time interval of approximately 16-17 minutes. In the fourth time stage 820, the electronic processor 1705 reduces the drive current provided to the LEDs 170 from 273 mA to 205 mA over a time interval of approximately 16-17 minutes. After execution of the fourth time stage 820, the electronic processor 1705 repeatedly calculates and monitors the drive current delivered to the LEDs 170. If the electronic processor 1705 determines a point 825 at which the drive current delivered to the LEDs 170 falls below a low drive current threshold (e.g., 130 mA), the electronic processor 1705 controls the power source 145 to cease providing a drive current to the light source 110 to turn off the light source 110.

FIG. 16 is similar to FIG. 15 but shows a graph of the LED current during execution of the ramp-down algorithm 800 when the lighting device 100 is operating in the LOW mode rather than in the HIGH mode. In the first time stage 830, the electronic processor 1705 maintains the drive current provided to drive the LEDs 170 at 300 mA for a time period of forty-five seconds. In other words, the electronic processor 1705 controls the drive current to operate the light source 110 in the LOW mode for forty-five seconds. In the second time stage 835, the electronic processor 1705 reduces the drive current provided to the LEDs 170 from 300 mA to 150 mA over a time interval of approximately 63 minutes. In the third time stage 840, the electronic processor 1705 reduces the drive current provided to the LEDs 170 from 150 mA to 100 mA over a time interval of approximately 63 minutes. In the fourth time stage 845, the electronic processor 1705 reduces the drive current provided to the LEDs 170 from 100 mA to 75 mA over a time interval of approximately 97 minutes. After execution of the fourth time stage 845, the electronic processor 1705 repeatedly calculates and monitors the drive current delivered to the LEDs 170. If the electronic processor 1705 determines a point 850 at which the drive current delivered to the LEDs 170 falls below a low drive current threshold (e.g., 50 mA), the electronic processor 1705 controls the power source 145 to cease providing a drive current to the light source 110 to turn off the light source 110.

In the examples of FIGS. 15 and 16, the electronic processor 1705 may reduce the drive current in each time stage in the same manner or in a similar manner as described above with respect to the time stages of FIG. 13. Also similar to the explanation of FIG. 13 above, it should be understood that the number of time stages, the PWM percentages and current values, the time values, and the low drive current threshold values detailed in the above examples of the ramp-down algorithm 700 are examples and may vary in other embodiments.

In the present embodiments, the drive current is calculated for the specific states according to a formula including both the drive current of the previous state and the time lapsed during the present state. It should be understood by those skilled in the art that other formulas, calculations, or ramp-down intervals may be implemented in other embodiments not exhaustively disclosed herein.

In an alternate embodiment, the electronic processor 1705 may drive the LEDs 170 with an incrementally decreasing drive current until a specified "plateau" threshold is reached, after which the drive current is held constant. Once the drive current reaches the specified "plateau" threshold and is no longer decreased, the remaining charge in the power source 145 is continuously measured and compared to a low voltage threshold (e.g., 10% of maximum charge). If the measured remaining charge falls below the low voltage threshold, the electronic processor 1705 decreases the specified "plateau" threshold and begins decreasing the drive current again until the new "plateau" threshold is reached. Subsequently, the drive current is held constant at that new "plateau" threshold. The remaining charge in the power source is again repeatedly measured and compared to a predetermined power-off threshold (e.g., 2.8 V). If the measured remaining charge falls below the power-off threshold, the lighting device 100 will turn to the OFF mode. The power-off threshold may vary in different embodiments depending on factors such as the characteristics of the power source 145 used by the lighting device 100.

It should be understood that similar to the ramp-up algorithm 400, 500 detailed above, the ramp-down algorithms 600 and/or 700 may also incrementally decrease the drive current in a predetermined number of steps or as a continuous function with zero or infinite number of steps. Other methods of implementing the ramp-down algorithm 600 based on factors other than time and/or remaining charge are possible to achieve the same purpose and are not exhaustively detailed herein.

In some embodiments, other types of batteries, such as lithium ion batteries, may be used as the power source 145. In such embodiments, similar ramp-up algorithms may still be employed, even though the lithium-ion chemistries may not experience as large of voltage drops as alkaline chemistries. Furthermore, it should be understood that other additional voltage thresholds may be used in the ramp-up algorithm 400 described above to further control operations of the lighting device 100. The lighting device 100 may also include additional components in other embodiments not exhaustively detailed herein to achieve the same purpose, and thus would not deviate from the teachings of the present application.

The invention claimed is:

1. A portable lighting device comprising:
 a housing;
 a light source supported by the housing;
 a power source positioned within the housing and coupled to the light source, wherein the power source is configured to provide a drive current to the light source and an intensity of the light source is dependent on the drive current; and
 an electronic processor positioned within the housing and coupled to the light source and the power source, wherein the electronic processor is configured to monitor a voltage of the power source, and
  execute a ramp-up algorithm to control the drive current based on the voltage of the power source, wherein the ramp-up algorithm is executed while the light source is outputting light;
 wherein the electronic processor is configured to execute the ramp-up algorithm to:
  determine that the power source is partially depleted; and
  in response to determining that the power source is partially depleted, incrementally ramp-up the drive current provided to the light source from the power source to a high drive current for a high mode of operation for the light source instead of initially setting the drive current to the high drive current.

2. The portable lighting device of claim 1, further comprising an actuator positioned on the housing, wherein the electronic processor is configured to:
 determine that the actuator has been actuated; and
 execute the ramp-up algorithm in response to determining that the actuator has been actuated.

3. The portable lighting device of claim 2, wherein the ramp-up algorithm is executed before the electronic processor generates a signal used to control the drive current provided by the power source to the light source to be constant.

4. The portable lighting device of claim 1, wherein the electronic processor is configured to determine that the power source is partially depleted in response to determining that the voltage of the power source is less than a first voltage threshold.

5. The portable lighting device of claim 4, wherein the electronic processor is configured to initially set the drive current to the high drive current in response to determining that the voltage of the power source is not less than the first voltage threshold.

6. The portable lighting device of claim 1, wherein the light source includes at least one light emitting diode.

7. A method of controlling a portable lighting device, the method comprising:

monitoring, with an electronic processor, a voltage of a power source, wherein the electronic processor is positioned within a housing of the portable lighting device, wherein the power source is coupled to a light source supported by the housing, and wherein the power source is configured to provide a drive current to the light source, and wherein an intensity of the light source is dependent on the drive current; and executing, with the electronic processor, a ramp-up algorithm to control the drive current based on the voltage of the power source, wherein the ramp-up algorithm is executed while the light source is outputting light;

wherein executing the ramp-up algorithm includes:

determining, with the electronic processor, that the power source is partially depleted; and in response to determining that the power source is partially depleted, with the electronic processor, incrementally ramp-up the drive current provided to the light source from the power source to a high drive current for a high mode of operation for the light source instead of initially setting the drive current to the high drive current.

8. The method of claim 7, further comprising:

determining, with the electronic processor, that an actuator positioned on the housing has been actuated;

wherein executing the ramp-up algorithm includes executing the ramp-up algorithm in response to determining that the actuator has been actuated.

9. The method of claim 8, wherein executing the ramp-up algorithm includes executing the ramp-up algorithm before the electronic processor generates a signal used to control the drive current provided by the power source to the light source to be constant.

10. The method of claim 7, wherein determining that the power source is partially depleted includes determining that the power source is partially depleted in response to determining that the voltage of the power source is less than a first voltage threshold.

11. The method of claim 10, further comprising initially setting, with the electronic processor, the drive current to the high drive current in response to determining that the voltage of the power source is not less than the first voltage threshold.

12. The method of claim 7, wherein the light source includes at least one light emitting diode.

13. A portable lighting device comprising:

a housing;

a light source supported by the housing;

a power source positioned within the housing and coupled to the light source, wherein the power source is configured to provide a drive current to the light source and an intensity of the light source is dependent on the drive current; and an electronic processor positioned within the housing and coupled to the light source and the power source, wherein the electronic processor is configured to monitor a time that the light source has been operating, and execute a ramp-down algorithm to control the drive current based on the time that the light source has been operating;

wherein the electronic processor is configured to execute the ramp-down algorithm by repeating steps of:

decreasing the drive current, and delaying a predetermined time period.

14. The portable lighting device of claim 13, wherein repeating the steps of decreasing the drive current and delaying the predetermined time period includes ramping down the drive current over a plurality of time stages;

wherein the electronic processor is configured to decrease the drive current such that the drive current reaches a respective predetermined value at an end of each time stage.

15. The portable lighting device of claim 14, wherein, during a final stage of the plurality of time stages, the electronic processor is configured to monitor the drive current provided by the power source to the light source;

control a drive current pulse width modulation (PWM) duty cycle to be maintained at a constant value until the monitored drive current is less than a low drive current threshold; and in response to determining that the monitored drive current is less than the low drive current threshold, control the drive current to cease providing the drive current to the light source to turn off the light source.

16. The portable lighting device of claim 13, wherein the electronic processor is configured to set, by executing a ramp-up algorithm, an initial value of the drive current that is decreased by the ramp-down algorithm.

17. The portable lighting device of claim 16, further comprising an actuator positioned on the housing, wherein the electronic processor is configured to:

determine that the actuator has been actuated; and execute the ramp-up algorithm in response to determining that the actuator has been actuated.

18. The portable lighting device of claim 17, wherein the ramp-up algorithm is executed before the electronic processor generates a signal used to control the drive current provided by the power source to the light source to be constant;

wherein the ramp-up algorithm is executed by the electronic processor, in response to determining that the power source is partially depleted, to control the drive current based on the voltage of the power source; and wherein the ramp-up algorithm is executed while the light source is outputting light.

19. The portable lighting device of claim 13, wherein the electronic processor is configured to decrease the drive current by reducing a pulse width modulation (PWM) duty cycle that controls when the power source provides the drive current to the light source.

20. The portable lighting device of claim 13, wherein the light source includes at least one light emitting diode.

* * * * *